United States Patent
Jeong et al.

(10) Patent No.: US 12,236,029 B2
(45) Date of Patent: *Feb. 25, 2025

(54) TOUCH INPUT SENSING UNIT HAVING FLOATING PATTERNS AND ELECTRONIC APPARATUS INCLUDING THE SAME

(71) Applicant: SAMSUNG DISPLAY CO., LTD., Yongin-si (KR)

(72) Inventors: Yeri Jeong, Suwon-si (KR); Tae Yong Eom, Suwon-si (KR); Kicheol Kim, Yongin-si (KR); Youngbae Jung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,263

(22) Filed: Jun. 6, 2023

(65) Prior Publication Data

US 2023/0315222 A1  Oct. 5, 2023

Related U.S. Application Data

(63) Continuation of application No. 17/682,999, filed on Feb. 28, 2022, now Pat. No. 11,675,449, which is a
(Continued)

(30) Foreign Application Priority Data

Jul. 2, 2019 (KR) .......................... 10-2019-0079640

(51) Int. Cl.
*G06F 3/041* (2006.01)
*G02B 1/08* (2006.01)
*G02B 1/11* (2015.01)

(52) U.S. Cl.
CPC ................ *G06F 3/041* (2013.01); *G02B 1/08* (2013.01); *G02B 1/11* (2013.01)

(58) Field of Classification Search
CPC ... G02B 1/08; G02B 1/11; G06F 2203/04111; G06F 2203/04112; G06F 3/041;
(Continued)

(56) References Cited

U.S. PATENT DOCUMENTS

| 10,254,908 B2 | 4/2019 | Na et al. |
| 10,707,280 B2 | 7/2020 | Jeong et al. |

(Continued)

FOREIGN PATENT DOCUMENTS

| KR | 10-2014-0051135 A | 4/2014 |
| KR | 10-1416438 B1 | 7/2014 |

(Continued)

OTHER PUBLICATIONS

Korean Notice of Allowance dated Dec. 4, 2024, issued in corresponding Korean Patent Application No. 10-2019-0079640 (7 pages).

*Primary Examiner* — Richard J Hong
(74) *Attorney, Agent, or Firm* — Womble Bond Dickinson (US) LLP

(57) ABSTRACT

An input sensor includes: a first sensing electrode including first sensing patterns and a first pattern disposed between the first sensing patterns; a second sensing electrode disposed on the same layer as the first sensing patterns; and a floating pattern including a plurality of segments each overlapping the first pattern and insulated from the second sensing electrode, wherein at least one of the plurality of segments is surrounded by a portion overlapping the first pattern among the second sensing electrode.

20 Claims, 17 Drawing Sheets

Related U.S. Application Data continuation of application No. 16/906,630, filed on Jun. 19, 2020, now Pat. No. 11,262,860.

(58) Field of Classification Search
CPC ...... G06F 3/0412; G06F 3/0446; G06F 3/047; G06F 3/0445; G02F 1/136286; G09G 3/2003

See application file for complete search history.

(56) References Cited

U.S. PATENT DOCUMENTS

| | | | |
|---|---|---|---|
| 10,852,886 B2 | 12/2020 | Kim et al. | |
| 2010/0060602 A1 | 3/2010 | Agari et al. | |
| 2013/0278513 A1* | 10/2013 | Jang | G06F 3/0445 |
| | | | 345/173 |
| 2014/0054070 A1 | 2/2014 | Ichiki | |
| 2014/0111709 A1 | 4/2014 | Kim et al. | |
| 2016/0077637 A1 | 3/2016 | Weaver et al. | |
| 2017/0031490 A1* | 2/2017 | Hashida | G02F 1/136286 |
| 2017/0336907 A1* | 11/2017 | Jeong | G06F 3/0446 |
| 2017/0364175 A1 | 12/2017 | Park et al. | |
| 2018/0032188 A1 | 2/2018 | Park et al. | |
| 2018/0033833 A1 | 2/2018 | An et al. | |
| 2018/0039360 A1 | 2/2018 | Akimoto et al. | |
| 2018/0129352 A1 | 5/2018 | Kim et al. | |
| 2018/0224984 A1* | 8/2018 | Kim | G06F 3/0412 |
| 2018/0292927 A1 | 10/2018 | Chu et al. | |
| 2018/0329555 A1 | 11/2018 | Kim et al. | |
| 2018/0348912 A1 | 12/2018 | Lee et al. | |
| 2018/0348932 A1 | 12/2018 | Lee et al. | |
| 2018/0348933 A1 | 12/2018 | Jun et al. | |
| 2018/0348937 A1 | 12/2018 | Pak et al. | |
| 2018/0348948 A1 | 12/2018 | Lee et al. | |
| 2019/0004638 A1* | 1/2019 | Lee | G06F 3/0412 |
| 2019/0155417 A1 | 5/2019 | Lee et al. | |
| 2019/0179445 A1* | 6/2019 | Moon | G09G 3/2003 |
| 2019/0204952 A1 | 7/2019 | Han et al. | |
| 2019/0302936 A1 | 10/2019 | Clark et al. | |
| 2019/0354239 A1 | 11/2019 | Nakayama | |
| 2020/0285348 A1* | 9/2020 | Nakayama | G06F 3/047 |

FOREIGN PATENT DOCUMENTS

| | | |
|---|---|---|
| KR | 10-2016-0099791 A | 8/2016 |
| KR | 10-2017-0131755 A | 11/2017 |
| KR | 10-2018-0119198 A | 11/2018 |
| KR | 10-2018-0121436 A | 11/2018 |
| KR | 10-2018-0131812 A | 12/2018 |
| KR | 10-1932650 B1 | 12/2018 |
| KR | 10-2019-0028616 A | 3/2019 |

* cited by examiner

TOUCH INPUT SENSING UNIT HAVING FLOATING PATTERNS AND ELECTRONIC APPARATUS INCLUDING THE SAME

CROSS-REFERENCE TO RELATED APPLICATIONS

This application is a continuation of U.S. patent application Ser. No. 17/682,999, filed Feb. 28, 2022, which is a continuation of U.S. patent application Ser. No. 16/906,630, filed Jun. 19, 2020, now U.S. Pat. No. 11,262,860, which claims priority to and the benefit of Korean Patent Application No. 10-2019-0079640, filed Jul. 2, 2019, the entire content of all of which is incorporated herein by reference.

BACKGROUND

1. Field

An embodiment of the present disclosure relates to an input sensing unit and an electronic apparatus including the same.

2. Description of the Related Art

An electronic apparatus may be activated by an electrical signal applied thereto. The electronic apparatus may include an input sensing unit, which is used to sense a variety of inputs provided from the outside (e.g., from an external object). To improve a user's convenience, the input sensing unit is used alone or as a part of a display device for displaying an image.

The input sensing unit includes a variety of electrode patterns, which are activated by electrical signals. An active region, in which the electrode patterns are activated, may be used to display image information or to sense an external touch event.

External light, which is incident into the electronic apparatus from the outside of the electronic apparatus, is reflected by the electrode patterns and is emitted to the outside. The reflected light is recognized by a user located outside of the electronic apparatus. The reflected light affects visibility of the active region.

The above information disclosed in this Background section is only for enhancement of understanding of the background and therefore the information discussed in this Background section does not necessarily constitute prior art.

SUMMARY

An embodiment of the present disclosure relates to an input sensing unit and an electronic apparatus including the same, and for example, to an input sensing unit with improved visibility and an electronic apparatus including the same.

An embodiment of the inventive concept include an input sensing unit with relatively improved visibility and an electronic apparatus including the same.

In an embodiment of the inventive concept, an input sensing unit may include a first connection pattern, a second connection pattern, which is disposed on a layer different from the first connection pattern and is electrically disconnected from the first connection pattern, a first sensor pattern, which is disposed on a layer different from the first connection pattern and is coupled to the first connection pattern, a second sensor pattern, which is disposed on a layer different from the first connection pattern and is coupled to the second connection pattern, and a floating pattern, which is overlapped with at least a portion of the first connection pattern when viewed in a plan view and is spaced apart from the second connection pattern.

In an embodiment, the floating pattern and the second connection pattern may be disposed on the same layer.

In an embodiment, the floating pattern may be spaced apart from the second sensor pattern, when viewed in a plan view.

In an embodiment, the floating pattern may be electrically disconnected from the first sensor pattern, the second sensor pattern, and the second connection pattern.

In an embodiment, the floating pattern and the second connection pattern may be disposed on different layers.

In an embodiment, the floating pattern may be overlapped with the second sensor pattern, when viewed in a plan view.

In an embodiment, the second sensor pattern may include a plurality of first mesh lines, each of which is extended in a first direction, and a plurality of second mesh lines, each of which is extended in a second direction crossing the first direction and is in contact with the first mesh lines. One of the first and second mesh lines overlapped with the first connection pattern may be extended in a direction crossing an extension direction of the first connection pattern.

In an embodiment, the floating pattern may be spaced apart from the first and second mesh lines overlapped with the first connection pattern and may be extended in a direction parallel to an extension direction of the first connection pattern.

In an embodiment, an extension direction of the floating pattern may be the first direction or the second direction.

In an embodiment, the floating pattern may be spaced apart from intersections of the first mesh lines and the second mesh lines.

In an embodiment, an overlapping area between the floating pattern and the first connection pattern may range from about 10% to 90% of an area of the first connection pattern.

In an embodiment, the floating pattern may include the same material as the second sensor pattern.

In an embodiment, the input sensing unit may further include a third connection pattern, which is disposed on the same layer as the first connection pattern and is spaced apart from the first connection pattern and the second connection pattern when viewed in a plan view, a third sensor pattern, which is disposed on a layer different from the third connection pattern and is coupled to the third connection pattern, and an additional floating pattern, which is disposed on a layer different from the third connection pattern and is overlapped with at least a portion of the third connection pattern when viewed in a plan view.

In an embodiment, the third connection pattern may be disposed to cross the first sensor pattern and may be electrically disconnected from the first sensor pattern. The additional floating pattern may be spaced apart from the first sensor pattern, when viewed in a plan view.

In an embodiment of the inventive concept, an electronic apparatus may include a base substrate and an input sensing unit, which is disposed on the base substrate to sense an external input. The input sensing unit may include a first connection pattern, a second connection pattern, which is disposed on a layer different from the first connection pattern and is electrically disconnected from the first connection pattern, a first sensor pattern, which is disposed on a layer different from the first connection pattern and is coupled to the first connection pattern, a second sensor pattern, which is disposed on a layer different from the first connection pattern and is coupled to the second connection pattern, and a floating pattern, which is overlapped with at least a portion of the first connection pattern when viewed in a plan view. The second sensor pattern may include a plurality of first mesh lines, each of which is extended in a direction, and a plurality of second mesh lines, which are connected to the first mesh lines to form a plurality of intersections with the first mesh lines. The first connection pattern may be disposed to cross the first mesh lines and the second mesh lines and may be electrically disconnected from the first mesh lines and the second mesh lines.

In an embodiment, the floating pattern may be disposed on the same layer as the first mesh lines and the second mesh lines and may be spaced apart from the first mesh lines and the second mesh lines when viewed in a plan view.

In an embodiment, the floating pattern may be extended along a direction crossing the first mesh lines to be disposed between the first mesh lines or may be extended along a direction crossing the second mesh lines to be disposed between the second mesh lines.

In an embodiment, the floating pattern may include a plurality of patterns, which are spaced apart from each other. The patterns may be arranged along the first connection pattern and may be spaced apart from the first mesh lines and the second mesh lines when viewed in a plan view.

In an embodiment, an overlapping area between the floating pattern and the first connection pattern may range from about 10% to 90% of an area of the first connection pattern.

In an embodiment, the electronic apparatus may further include a display unit, which is disposed between the base substrate and the input sensing unit and includes a plurality of light-emitting regions. The first mesh lines and the second mesh lines may be spaced apart from the light-emitting regions, when viewed in a plan view.

BRIEF DESCRIPTION OF THE DRAWINGS

An embodiment will be more clearly understood from the following brief description taken in conjunction with the accompanying drawings. The accompanying drawings represent non-limiting, example embodiments as described herein.

Figure 1:
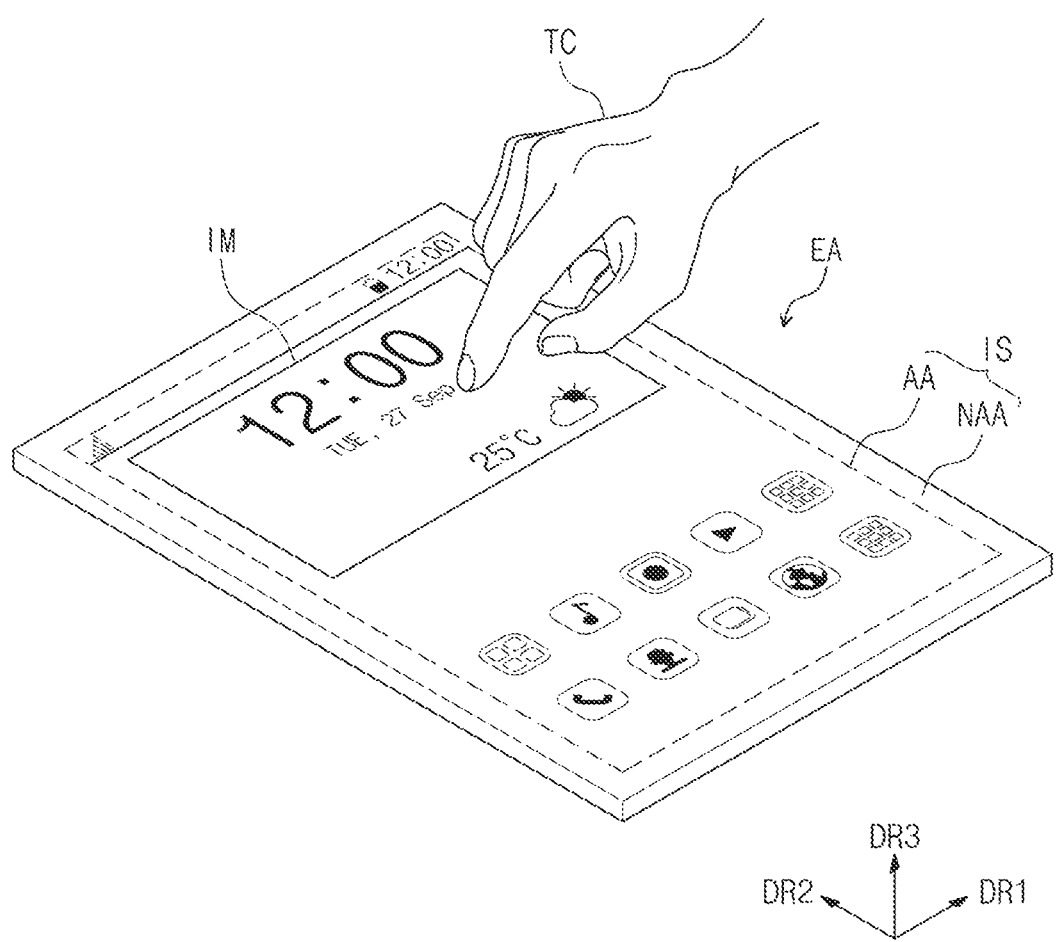
FIG. 1 is a perspective view illustrating an electronic apparatus in an embodiment of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

An embodiment of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating an electronic apparatus in an embodiment of the inventive concept. An electronic apparatus EA may be activated by an electrical signal applied thereto. The electronic apparatus EA may include a display surface IS, which is defined by a plane extending along a first direction DR1 and a second direction DR2. The display surface IS of the electronic apparatus may be is selectively activated by an electrical signal applied thereto. When viewed in a plan view, the display surface IS may be divided into an active region AA and a peripheral region NAA.

The active region AA may be a region that is electrically activated when an electrical signal is supplied thereto. According to the design of the electronic apparatus EA, the active region AA may be activated to perform various functions.

In an embodiment, the active region AA may be a sensing region, which is used to sense an input event provided from the outside. As shown in FIG. 1, the electronic apparatus EA may sense an external input TC applied to the active region AA. That is, the electronic apparatus EA may serve as an input device.

FIG. 1 illustrates an example in which a user's hand is used as the external input TC, but various external inputs may be used as the external input TC. For example, the external input TC may be provided in various forms including a contact type touch (e.g., by a user's hand or finger, a stylus, etc.), a non-contact type touch (e.g., proximity sensing), force, pressure, or light, but the inventive concept is not limited to a specific type of the external input TC.

In addition, the active region AA may be a display region of displaying information. The electronic apparatus EA may display an image IM on the active region AA, and in this case, a user may obtain information from the image IM. In this sense, the electronic apparatus EA may be used as an output device or graphical interface.

The peripheral region NAA may be located adjacent to the active region AA. The peripheral region NAA may not be used to display an image or to sense an external input, even when the electronic apparatus EA is activated or an electrical signal is applied to the peripheral region NAA.

Signal lines for providing external signals to the active region AA or driving devices for driving the active region AA may be located in the peripheral region NAA. The peripheral region NAA may be adjacent to at least one of edge regions of the active region AA.

In an embodiment, the peripheral region NAA is illustrated to have a frame shape surrounding the active region AA. However, embodiments according to the inventive concept are not limited thereto, and in certain embodiments, the peripheral region NAA may be omitted from the electronic apparatus EA. The shape of the peripheral region NAA may be variously changed, and the inventive concept is not limited to a specific shape of the peripheral region NAA.

FIG. 1 illustrates an example in which the electronic apparatus EA is a touch screen apparatus. However, the inventive concept is not limited to this example, and according to some embodiments, the electronic apparatus EA may not have a display function.

FIGS. 2A to 2F are sectional views, each of which illustrates an electronic apparatus in an embodiment of the inventive concept. FIGS. 2A to 2F illustrate vertical sections, each of which is taken parallel to a plane defined by the second and third directions DR2 and DR3. In FIGS. 2A to 2F, some examples of a stacking structure of functional panels and/or functional units constituting the electronic apparatus EA are illustrated in a simplified manner.

In an embodiment, the electronic apparatus EA may include a display panel, an input sensing unit (or input sensor), an anti-reflection unit (or anti-reflector), and a window unit (or window). At least some of the display panel, the input sensing unit, the anti-reflection unit, and the window unit may be successively formed by a successive process or may be bonded to each other by an adhesive member. FIGS. 2A to 2F illustrate examples in which a pressure sensitive adhesive film PSA is used as the adhesive member. However, in an embodiment to be described in more detail below, the adhesive member may be any suitable adhesive material or a gluing agent. In an embodiment, the anti-reflection unit and light control unit may be replaced with other unit or may be omitted.

In FIGS. 2A to 2F, if one of the input-sensing unit, the anti-reflection unit, the light control unit (or light controller), or the window unit is formed on another element by a successive process, the unit will be expressed using a term "layer". By contrast, if one of the input sensing unit, the anti-reflection unit, the light control unit, or the window unit is bonded to another element by an adhesive member, the unit will be expressed using a term "panel". The unit expressed using the term "panel" may include a base layer (e.g., a synthetic resin film, a composite film, or a glass substrate) providing a base surface, but for the unit expressed using the term "layer", the base layer may be omitted. In other words, the unit expressed using the term "layer" may be disposed on a base surface that is disposed by another element or unit.

The input sensing unit, the anti-reflection unit, and the window unit may be referred to as an input sensing panel ISP, an anti-reflection panel RPP, and a window panel WP or to as an input sensing layer ISL, an anti-reflection layer RPL, and a window layer WL, according to the presence or absence of the base layer.

Figure 2A:
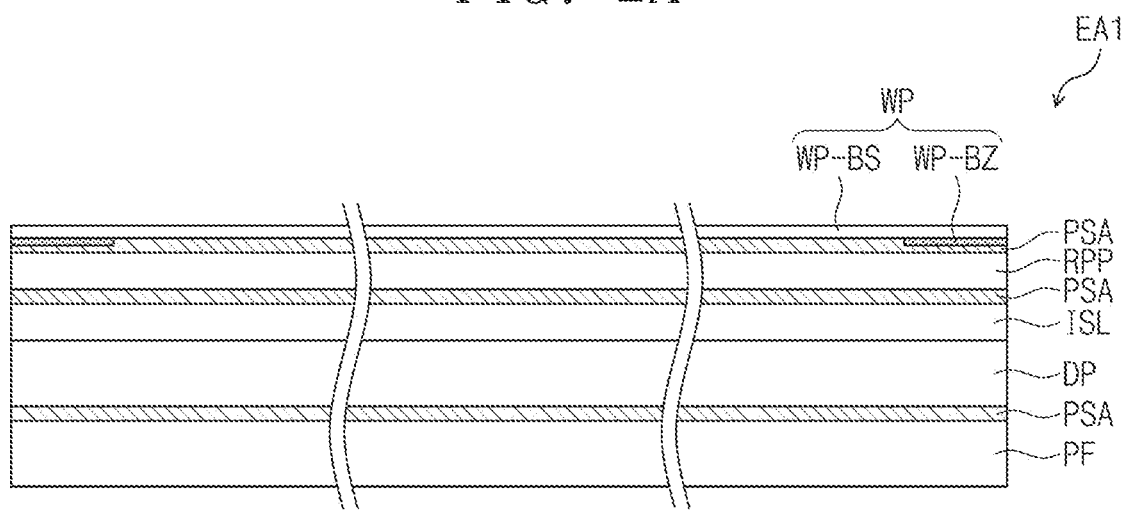
FIGS. 2A to 2F are sectional views, each of which illustrates an electronic apparatus in an embodiment of the inventive concept.
Figure 2A:
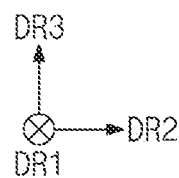

As shown in FIG. 2A, an electronic apparatus EA1 may include a display panel DP, the input sensing layer ISL, the anti-reflection panel RPP, the window panel WP, and a protection member PF. The input sensing layer ISL may be directly disposed on the display panel DP. In the specification, the expression "an element B1 may be directly disposed on an element A1" may mean that an adhesive member is not disposed between the elements A1 and B1. After the formation of the element A1, the element B1 may be formed on a base surface, which is provided by the element A1, through a successive process.

Pressure sensitive adhesive (PSA) films may be respectively disposed between the input sensing layer ISL and the anti-reflection panel RPP, between the anti-reflection panel RPP and the window panel WP, and between the display panel DP and the protection member PF.

The display panel DP may display the image IM (e.g., see FIG. 1), and the input sensing layer ISL may obtain information regarding coordinates of the external input TC (e.g., see FIG. 1). The protection member PF may support the display panel DP and may protect the display panel DP from an external impact.

The protection member PF may include a plastic film serving as a base layer. The protection member PF may include a plastic film containing one selected from the group consisting of thermoplastic resins (e.g., polyethylene terephthalate (PET), polyethylene (PE), polyvinylchloride (PVC), polypropylene (PP), polystyrene (PS), polyacrylonitrile (PAN), styrene-acrylonitrile copolymer (SAN), acrylonitrile-butadiene-styrene (ABS), polymethyl methacrylate (PMMA), and combinations thereof). In the case where the protection member PF is formed of polyethylene terephthalate (PET), the protection member PF may be excellent in heat-resistant, fatigue strength, and electric characteristics and may be insensitive to temperature and humidity.

Materials for the protection member PF are not limited to plastic resins, and organic/inorganic composites may be used for the protection member PF. The protection member PF may include a porous organic layer and an inorganic material filling pores of the organic layer.

In an embodiment of the inventive concept, the display panel DP may be a light-emitting type display panel, but embodiments according to the inventive concept are not limited to a specific type of the display panel DP. For example, the display panel DP may be an organic light emitting display panel or a quantum dot light emitting display panel. A light emitting layer of the organic light emitting display panel may be formed of or include an organic luminescent material. A light emitting layer of the quantum dot light emitting display panel may include quantum dots and/or quantum rods. For the sake of simplicity, the description that follows will refer to an example in which the display panel DP is the organic light emitting display panel.

The anti-reflection panel RPP may reduce reflectance of a natural or solar light that is incident from an outer space to the window panel WP. In an embodiment, the anti-reflection panel RPP may include a phase retarder and a polarizer. The phase retarder may be of a film type or a liquid crystal coating type and may include a N/2 and/or N/4 phase retarder. The polarizer may also be of a film type or a liquid crystal coating type. The polarizer of the film type may include an elongated synthetic resin film, whereas the polarizer of the liquid crystal coating type may include liquid crystals arranged with a specific orientation. The phase retarder and the polarizer may further include a protection film. At least one of the phase retarder, the polarizer, or the protection films thereof may be used as a base layer of the anti-reflection panel RPP.

In an embodiment, the anti-reflection panel RPP may include color filters. The color filters may be arranged in a specific manner. The arrangement of the color filters may be determined in consideration of colors of lights to be emitted from pixels in the display panel DP. The anti-reflection panel RPP may further include a black matrix that is adjacent to the color filters.

In an embodiment, the window panel WP may include a base layer WP-BS and a light-blocking pattern WP-BZ. The base layer WP-BS may include a glass substrate and/or a synthetic resin film. The base layer WP-BS may not be limited to a single-layered structure. The base layer WP-BS may include two or more films that are attached to each other by an adhesive member.

The light-blocking pattern WP-BZ may be partially overlapped with the base layer WP-BS. The light-blocking pattern WP-BZ may be located on the rear surface of the base layer WP-BS to define a bezel region of the electronic apparatus EA (e.g., the peripheral region NAA of FIG. 1).

The light-blocking pattern WP-BZ may be a colored organic layer and may be formed by, for example, a coating method. In an embodiment, the window panel WP may further include a functional coating layer provided on the front surface of the base layer WP-BS. The functional coating layer may include an anti-fingerprint layer, an anti-reflection layer, a hard coating layer, and so forth.

In FIGS. 2B to 2F, the window panel WP and the window layer WL are briefly illustrated without distinction between the base layer WP-BS and the light-blocking pattern WP-BZ.

Figure 2B:
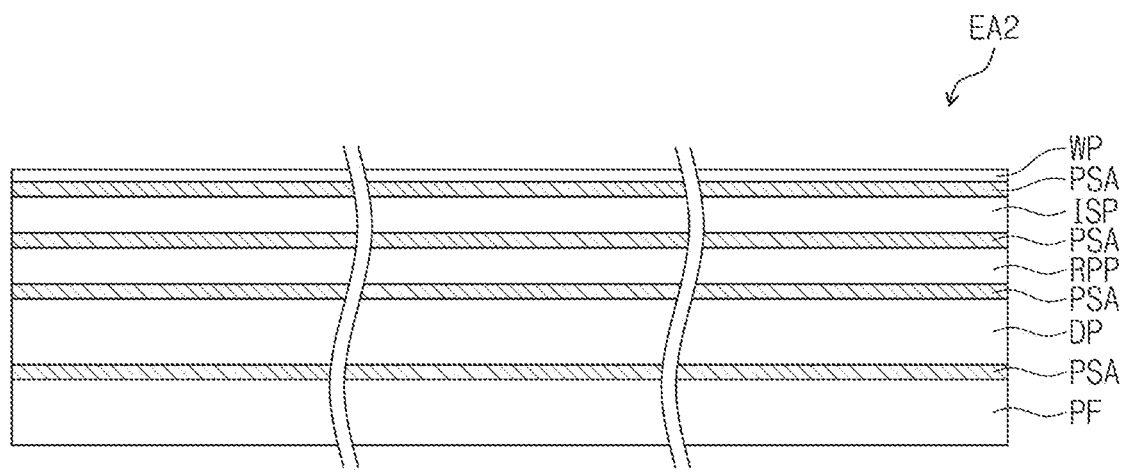
Figure 2B:
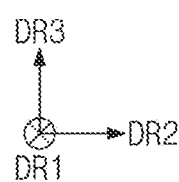
Figure 2C:
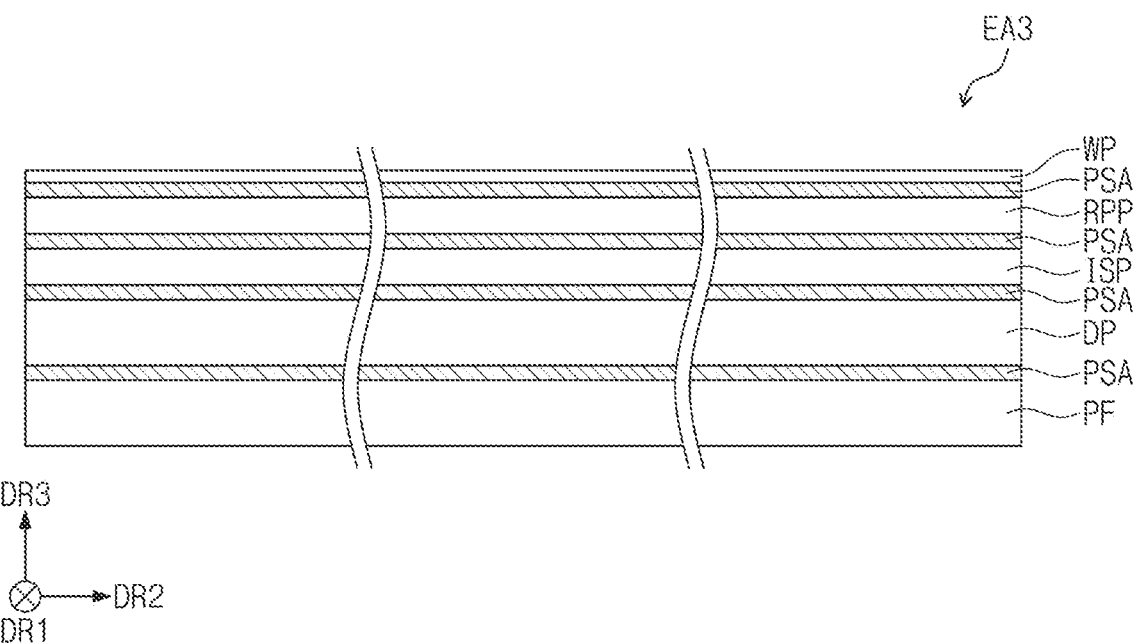

As shown in FIGS. 2B and 2C, an electronic apparatus EA2 or EA3 may include the protection member PF, the display panel DP, the input sensing panel ISP, the anti-reflection panel RPP, and the window panel WP. A stacking order of the input sensing panel ISP and the anti-reflection panel RPP may be changed.

Figure 2D:
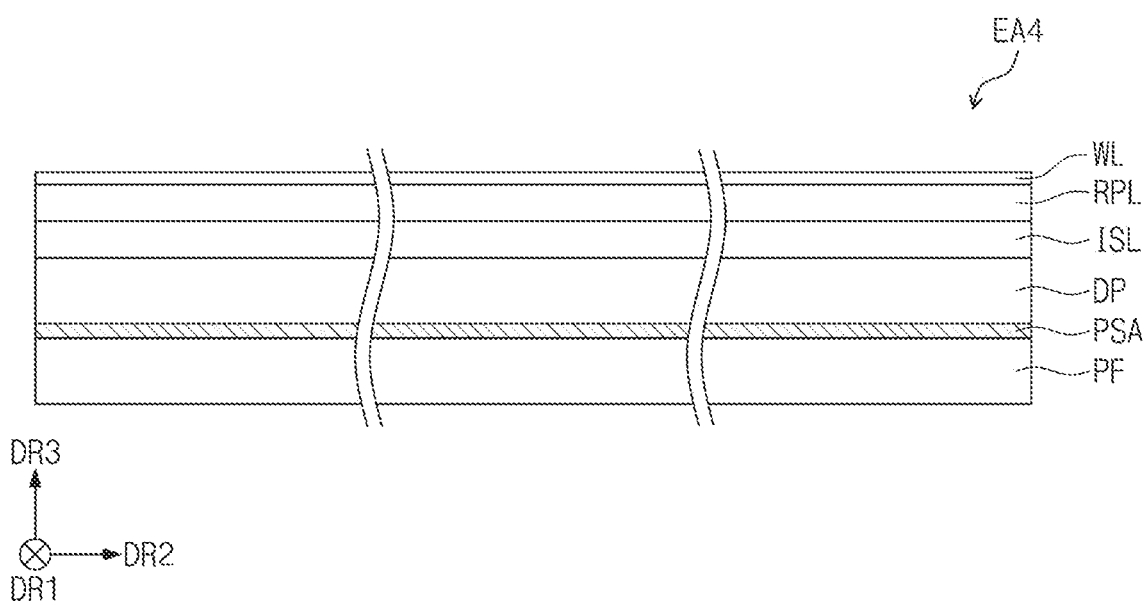

As shown in FIG. 2D, an electronic apparatus EA4 may include the protection member PF, the display panel DP, the input sensing layer ISL, the anti-reflection layer RPL, and the window layer WL. Adhesive members may be omitted from the electronic apparatus EA4, and the input sensing layer ISL, the anti-reflection layer RPL, and the window layer WL may be formed on a base surface, which is provided by the display panel DP, by a successive process. A stacking order of the input sensing layer ISL and the anti-reflection layer RPL may be changed.

Here, the anti-reflection layer RPL may include a liquid crystal coating type phase retarder and a liquid crystal coating type polarizer. The phase retarder and the polarizer may include a discotic liquid crystal layer having a tilt angle in a specific direction.

Figure 2E:
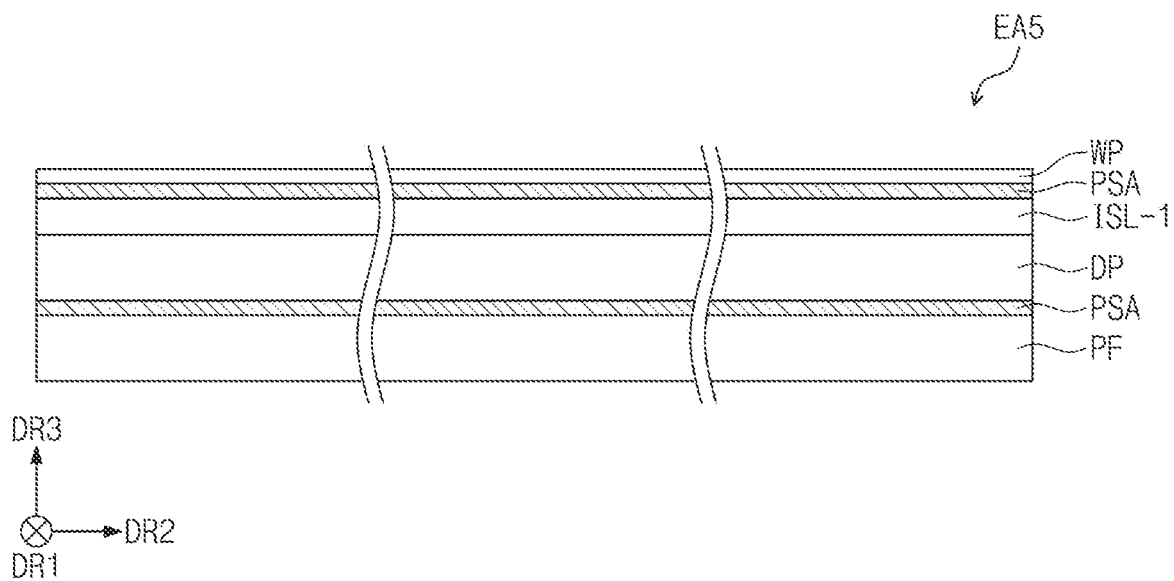
Figure 2F:
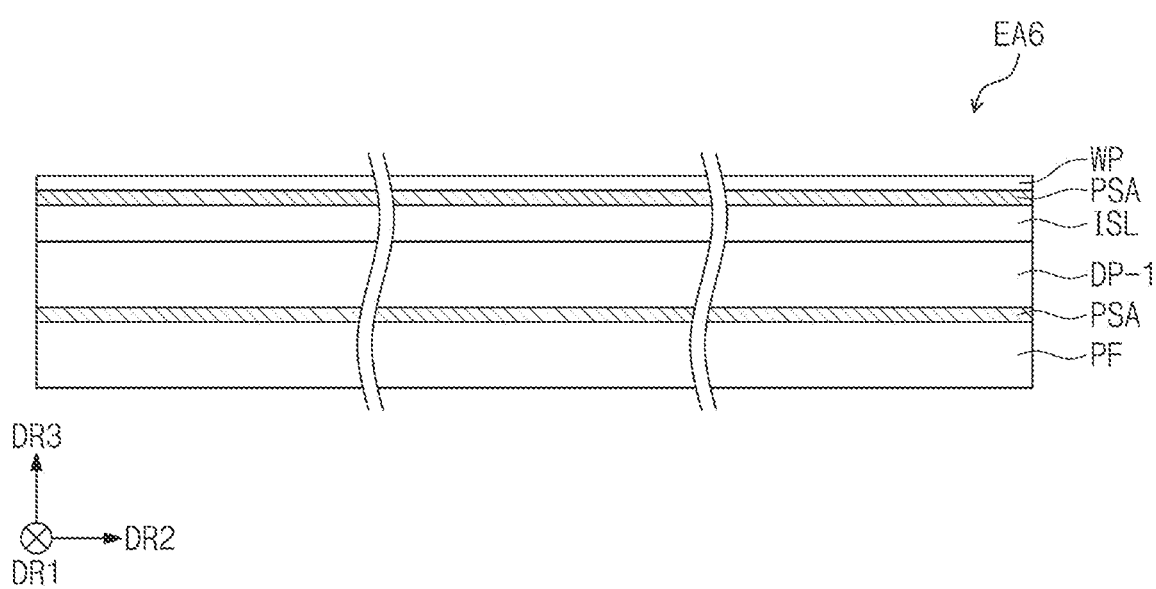

As shown in FIGS. 2E and 2F, an electronic apparatus EA5 or EA6 may not include an independent anti-reflection layer. Unlike the input sensing panel ISP or the input sensing layer ISL shown in FIGS. 2A to 2D, an input sensing layer ISL-1 shown in FIG. 2E may further include a color filter having an anti-reflection function. Unlike the display panel DP illustrated in FIGS. 2A to 2D, a display panel DP-1 shown in FIG. 2F may further include a color filter having an anti-reflection function.

Figure 3:
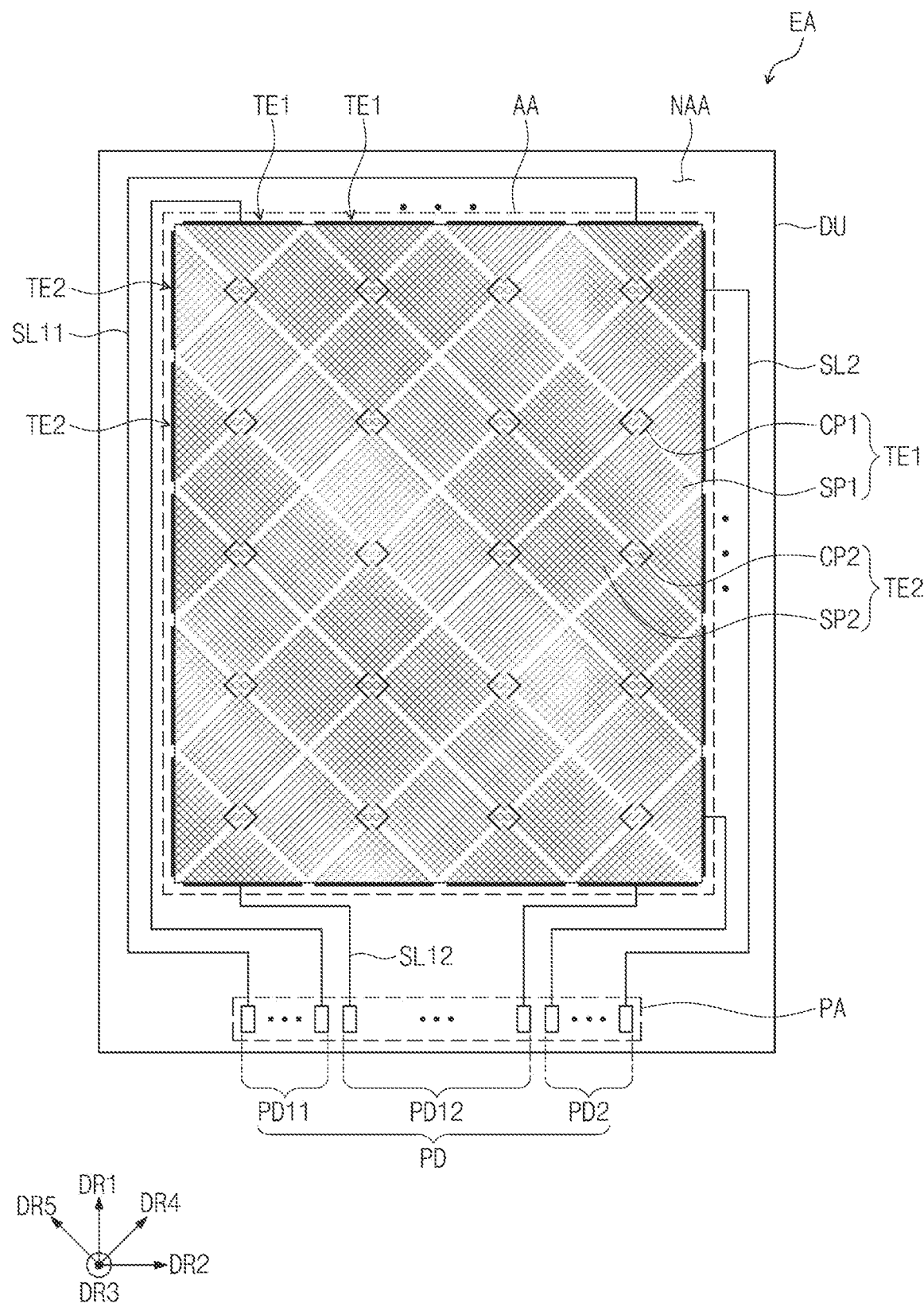
FIG. 3 is a plan view briefly illustrating an electronic apparatus in an embodiment of the inventive concept.
Figure 4:
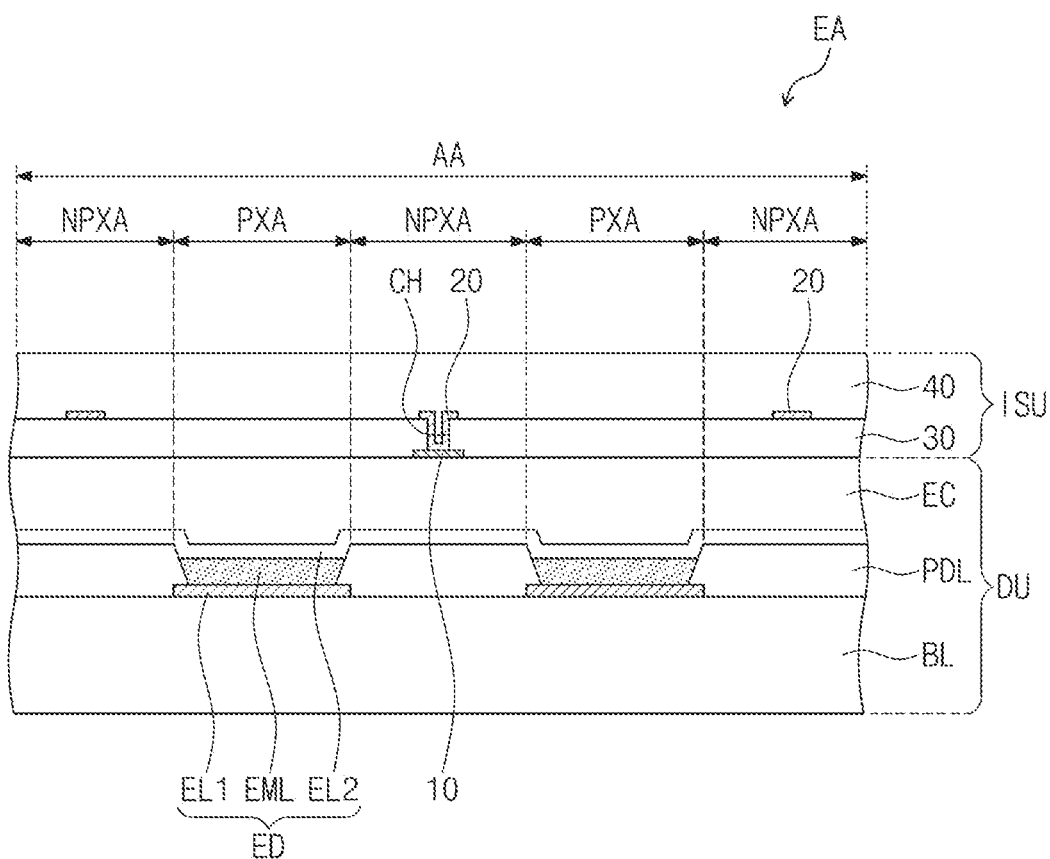
FIG. 4 is a sectional view illustrating a region of the electronic apparatus of FIG. 3.

FIG. 3 is a plan view briefly illustrating an electronic apparatus in an embodiment of the inventive concept. FIG. 4 is a sectional view illustrating a region of the electronic apparatus of FIG. 3. For convenience in illustration, a part of the electronic apparatus (e.g., a display unit (or display) DU and an input sensing unit ISU) is illustrated in FIGS. 3 and 4, and a region of the active region AA is illustrated in FIG. 4. Hereinafter, the electronic apparatus in an embodiment of the inventive concept will be described with reference to FIGS. 3 and 4.

In an embodiment, the input sensing unit ISU is illustrated to be disposed on the display unit DU. However, embodiments according to the inventive concept are not limited to this example, and in an embodiment, the input sensing unit ISU may be disposed below the display unit DU or may be inserted in the display unit DU. The position of the input sensing unit ISU may be variously changed, and the inventive concept is not limited to a specific position of the input sensing unit ISU.

Referring to FIG. 4, the display unit DU may include a base layer BL, a pixel definition layer PDL, a display device ED, and an encapsulation layer EC. The display unit DU may include a plurality of light-emitting regions PXA and a plurality of non-light-emitting regions NPXA, which are arranged in the active region AA. Although only two regions of the light emitting regions PXA are illustrated in FIG. 4, the inventive concept is not limited thereto.

In an embodiment, the base layer BL may include a plurality of insulating layers and a plurality of conductive layers. The conductive layers and the insulating layers may constitute a thin-film transistor and a capacitor, which are connected to the display device ED.

The pixel definition layer PDL may be disposed on the base layer BL. Openings may be defined in the pixel definition layer PDL. The openings may define the light emitting regions PXA, respectively.

The display devices ED may be disposed on the base layer BL. The display devices ED may be disposed at positions corresponding to the openings, respectively. The display device ED may emit light, which constitutes an image to be displayed, in response to electrical signals, which are transmitted through the thin-film transistor and the capacitor constituting the base layer BL.

The display device ED may be realized in various forms. For example, the display device ED may be an electrophoretic device, a liquid crystal capacitor, an electrowetting device, an organic light emitting device, a quantum dot light emitting device, a micro LED, or a nano LED. The description that follows will refer to an example in which the display device ED is an organic light emitting device.

The display device ED may include a first electrode EL1, a light emitting layer EML, and a second electrode EL2. In the display device ED, a potential difference between the first electrode EL1 and the second electrode EL2 may be adjusted to activate the light emitting layer EML or to emit light from the light emitting layer EML. Thus, the light emitting regions PXA may correspond to regions, on which the light emitting layers EML are disposed.

The light emitting regions PXA may have at least two different sizes or areas. For example, the area of each of the light emitting regions PXA may be determined based on color of light emitted therefrom. That is, in an embodiment of the inventive concept, the light emitting region may have an area or size suitable for the color of light emitted therefrom, and this may allow various colors to have uniform optical efficiency. The encapsulation layer EC may cover the display device ED. The encapsulation layer EC may include at least one inorganic layer and/or at least one organic layer. The encapsulation layer EC may prevent moisture from entering the display device ED and protect the display device ED. In addition, the encapsulation layer EC may be disposed between the display device ED and the input sensing unit ISU to electrically separate the display device ED from the input sensing unit ISU. However, the inventive concept is not limited to this example, and in certain embodiments, the encapsulation layer EC may be provided in the form of a glass substrate or a plastic substrate. In this case, a space between the encapsulation layer EC and the display device ED may be filled with an inert or inactive gas. The structure of the display unit DU may be variously changed, and the inventive concept is not limited to a specific structure of the display unit DU.

The input sensing unit ISU may be directly disposed on the encapsulation layer EC. For example, the input sensing unit ISU may be directly deposited on a top surface of the encapsulation layer EC and then may be patterned. However, embodiments according to the inventive concept are not limited to this example, and in an embodiment, the electronic apparatus EA may further include another element (e.g., a color filter or a buffer layer), which is interposed between the input sensing unit ISU and the encapsulation layer EC.

Referring to FIG. 3, the input sensing unit ISU may include a first sensing electrode TE1, a second sensing electrode TE2, first signal lines SL11 and SL12, a second signal line SL2, and a pad PD.

The first sensing electrode TE1 may be extended in the first direction DR1. In an embodiment, a plurality of the first sensing electrodes TE1 may be arranged in the second direction DR2. The first sensing electrode TE1 may include a plurality of first sensor patterns SP1, which are arranged in the first direction DR1, and a plurality of first connection patterns CP1, which are disposed between the first sensor patterns SP1 to connect adjacent ones of the first sensor patterns SP1 to each other.

The second sensing electrode TE2 may be disposed to be electrically disconnected from the first sensing electrode TE1. The second sensing electrode TE2 may be extended in the second direction DR2. In an embodiment, a plurality of the second sensing electrodes TE2 may be arranged in the first direction DR1. The second sensing electrode TE2 may include a plurality of second sensor patterns SP2, which are arranged in the second direction DR2, and a plurality of second connection patterns CP2, which are disposed between the second sensor patterns SP2 to connect adjacent ones of the second sensor patterns SP2 to each other.

The input sensing unit ISU may sense the external input TC (e.g., see FIG. 1) by sensing a change in capacitance between the first sensing electrode TE1 and the second sensing electrode TE2 or by sensing a change in capacitance of each of the first and second sensing electrodes TE1 and TE2. In an embodiment, the input sensing unit ISU may sense the external input TC in various manners, and the inventive concept is not limited to a specific embodiment.

The first signal lines SL11 and SL12 may be connected to the first sensing electrode TE1. The first signal lines SL11 and SL12 may be disposed in the peripheral region NAA and may not be recognized by a user. The second signal line SL2 may be connected to the second sensing electrode TE2. The second signal line SL2 may be disposed in the peripheral region NAA and may not be recognized by a user.

In an embodiment, the first signal lines SL11 and SL12 may include an upper signal line SL11 and a lower signal line SL12. The upper signal line SL11 may be connected to an upper portion of the first sensing electrode TE1, and the lower signal line SL12 may be connected to a lower portion of the first sensing electrode TE1.

The upper signal line SL11 and the lower signal line SL12 may be connected to pads PD11 and PD12, respectively, which are spaced apart from each other. Thus, even when the first sensing electrode TE1 is longer than the second sensing electrode TE2, it may be possible to uniformly apply an electrical signal to the entire region of the input sensing unit ISU. Accordingly, regardless of the shape of the input sensing unit ISU, the input sensing unit ISU may provide a uniform touch sensing environment throughout the entire region of the active region AA.

However, the inventive concept is not limited to this example. As an example, opposite ends of the first sensing electrode TE1 may also be connected to a pair of signal lines. As another example, an end of each of the first and second sensing electrodes TE1 and TE2 may be connected to a signal line. Furthermore, the input sensing unit ISU may be operated in various manners, but the inventive concept is not limited to a specific operation method.

The pads PD may include first pads PD11 and PD12 and a second pad PD2. As described above, each of the pads PD may be connected to a corresponding one of the first signal lines SL11 and SL12 or the second signal line SL2 and may be electrically connected to the first sensing electrode TE1 or the second sensing electrode TE2. Electrical signals, which are provided from the outside, may be provided to the input sensing unit ISU through the pads PD.

Referring back to FIG. 4, the input sensing unit ISU may include a plurality of conductive layers and a plurality of insulating layers, which are vertically stacked. In an embodiment, the input sensing unit ISU may include a first conductive layer 10, a second conductive layer 20, a first insulating layer 30, and a second insulating layer 40, which are disposed on different layers or at different levels.

The first conductive layer 10 may be disposed on the display panel DP. The second conductive layer 20 may be disposed on the first conductive layer 10 and the first insulating layer 30. Each of the first sensing electrode TE1, the second sensing electrode TE2, the first signal lines SL11 and SL12, the second signal line SL2, and the pads PD may be included in one of the first and second conductive layers 10 and 20.

Each of the first and second conductive layers 10 and 20 may include a plurality of conductive patterns. The conductive patterns may include the first sensing electrode TE1, the second sensing electrode TE2, the first signal lines SL11 and SL12, the second signal line SL2, and the pads PD described above.

The conductive patterns constituting each of the first and second conductive layers 10 and 20 may not be overlapped the light emitting regions PXA, when viewed in a plan view. In this case, even if the first and second conductive layers 10 and 20 are formed of an opaque material, it may be possible to prevent the first and second conductive layers 10 and 20 from affecting the image IM displayed on the light emitting regions PXA. However, embodiments according to the inventive concept are not limited to this example or a specific embodiment, and each of the first and second conductive layers 10 and 20 may include a conductive pattern or an optically transparent conductive pattern that is overlapped with at least a portion of the light emitting regions PXA.

The first insulating layer 30 may be provided between the first and second conductive layers 10 and 20. When viewed in a sectional view, the first insulating layer 30 may separate the first conductive layer 10 from the second conductive layer 20. The first conductive layer 10 and a portion of the second conductive layer 20 may be electrically connected to each other through a contact hole CH, which is formed to penetrate the first insulating layer 30.

The second insulating layer 40 may be disposed on the first insulating layer 30. The second insulating layer 40 may cover the second conductive layer 20. The second insulating layer 40 may protect the second conductive layer 20 from an external environment.

The first and second insulating layers 30 and 40 may have an insulating property and an optically transparent property. Accordingly, even when the light-emitting region PXA is covered with the first and second insulating layers 30 and 40, light from the light emitting region PXA may be easily recognized by a user located outside the input sensing unit ISU.

The first insulating layer 30 and the second insulating layer 40 may include at least one inorganic layer and/or at least one organic layer. In the case where the first and second insulating layers 30 and 40 are substantially formed of or include organic materials, flexibility of the input sensing unit ISU may be improved. Alternatively, in the case where the first and second insulating layers 30 and 40 are substantially formed of or include inorganic materials, the input sensing unit ISU may have a thin structure and an improved impact resistance property. In an embodiment, various materials may be used for the first and second insulating layers 30 and 40, but the inventive concept is not limited to specific materials.

Figure 5A:
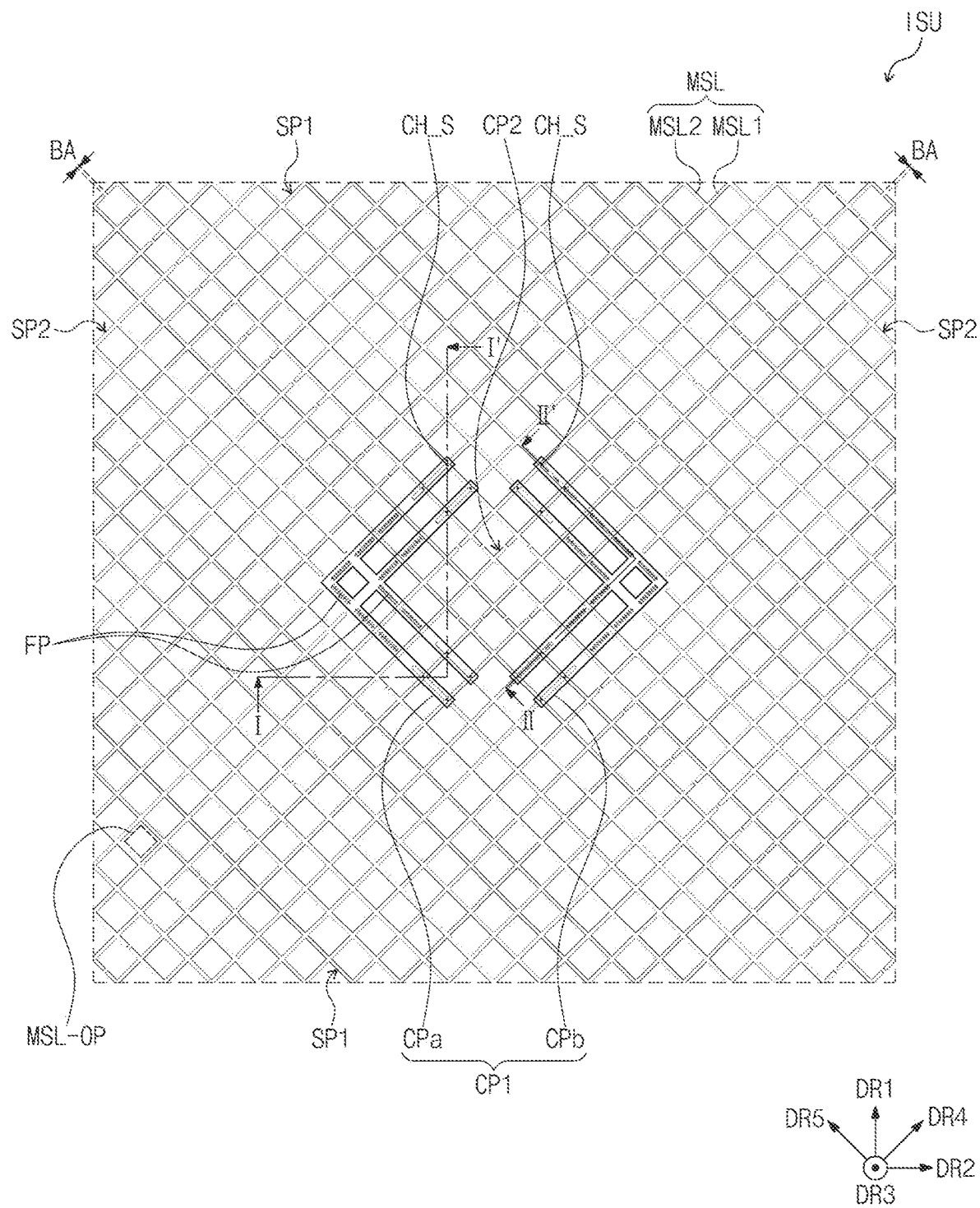
FIG. 5A is an enlarged plan view illustrating a region of FIG. 3.
Figure 5B:
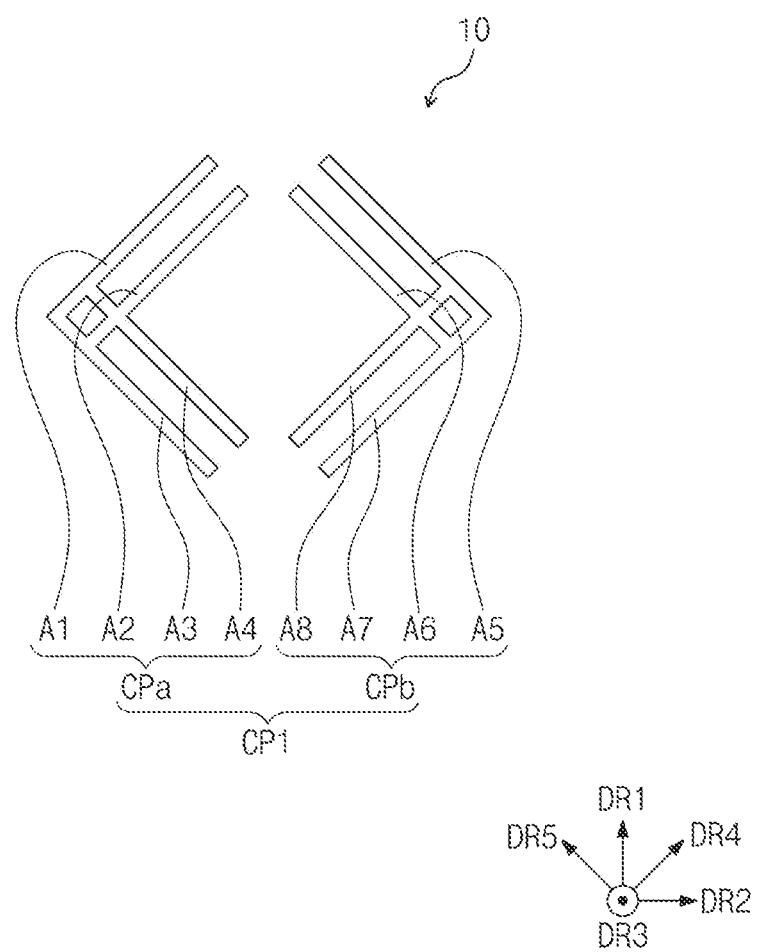
FIGS. 5B and 5C are plan views illustrating some of the elements shown in FIG. 5A.
Figure 5C:
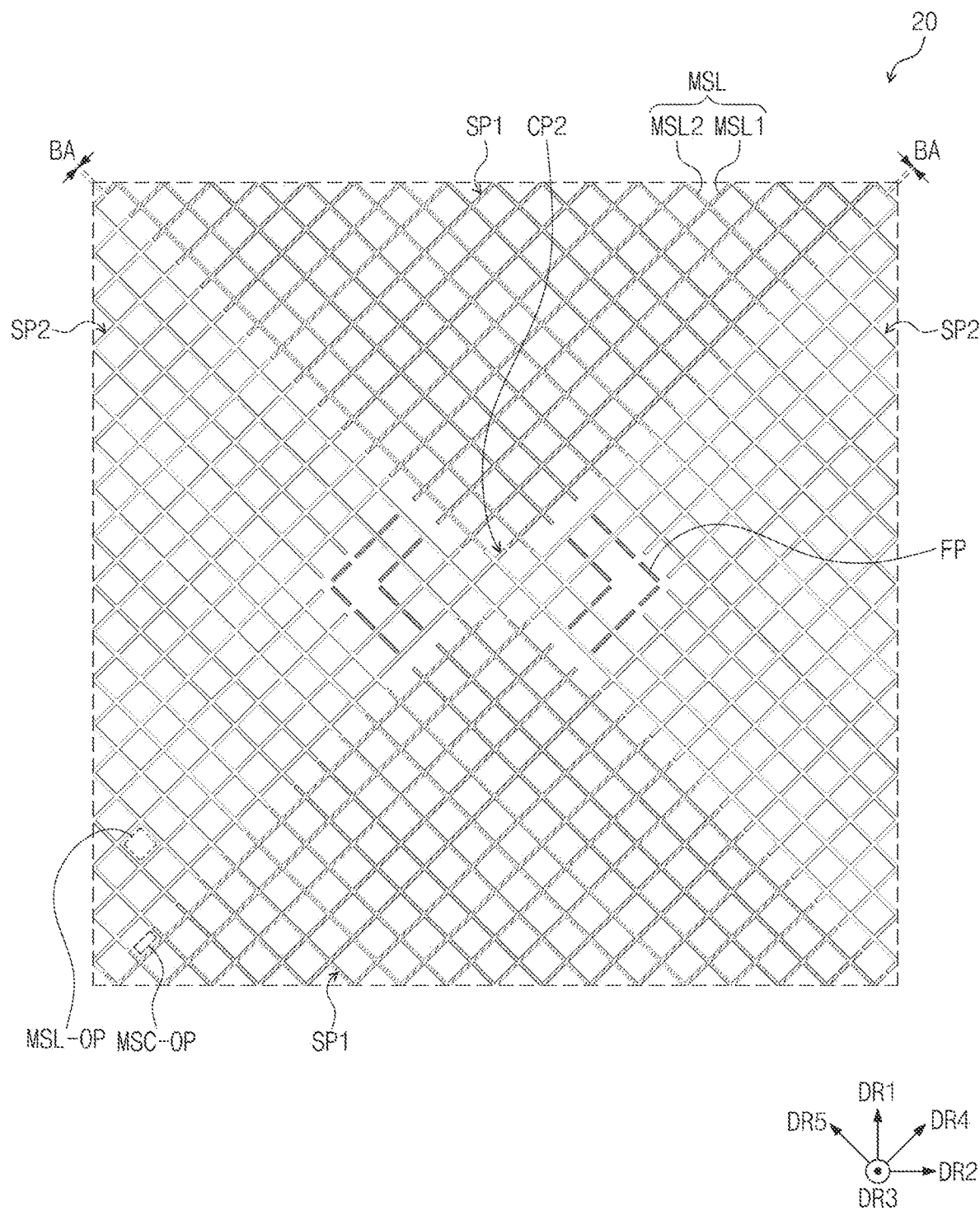

FIG. 5A is an enlarged plan view illustrating a region of FIG. 3. FIGS. 5B and 5C are plan views illustrating some of the elements shown in FIG. 5A. For convenience in illustration, FIG. 5A illustrates a region of the input sensing unit ISU, in which one of the first connection patterns CP1 and one of the second connection patterns CP2 are disposed. In particular, only conductive patterns are illustrated in FIG. 5A, but the first and second insulating layers 30 and 40 are omitted in FIG. 5A.

FIG. 5B illustrates the first conductive layer 10 of FIG. 5A, and FIG. 5C illustrates the second conductive layer 20 of FIG. 5A. Hereinafter, an embodiment of the inventive concept will be described in more detail with reference to FIGS. 5A to 5C.

In an embodiment, a plurality of the first sensor patterns SP1 may be disposed to be spaced apart from each other in the first direction DR1, and a plurality of the second sensor patterns SP2 may be disposed to be spaced apart from each other in the second direction DR2. Each of the first connection patterns CP1 may be extended in the first direction DR1 to connect the first sensor patterns SP1 to each other, and each of the second connection pattern CP2 may be extended in the second direction DR2 to connect the second sensor patterns SP2 to each other.

The first connection pattern CP1 and the second connection pattern CP2 may be disposed on different layers or at different levels. The first connection pattern CP1 may be composed of mesh lines MSL or a transparent pattern. The first connection pattern CP1 and the first sensor patterns SP1 may be disposed on different layers or at different levels and may be connected to each other through a contact hole CH_S.

In an embodiment, the first connection pattern CP1 is illustrated to constitute the first conductive layer 10, and the second connection pattern CP2, the first sensor patterns SP1, and the second sensor patterns SP2 are illustrated to constitute the second conductive layer 20.

Referring to FIGS. 5A and 5B, the first connection pattern CP1 is illustrated to have a shape, which is spaced apart from the second connection pattern CP2 when viewed in a plan view and is overlapped with the first sensor patterns SP1 via the second sensor patterns SP2. In an embodiment, the first connection pattern CP1 and the first sensor patterns SP1 may be disposed on the same layer or at the same level. Here, the first sensor patterns SP1 and the second sensor patterns SP2 may be disposed on different layers or different levels, the first connection pattern CP1 and the first sensor patterns SP1 may be formed to form a single object, and the second connection pattern CP2 and the second sensor patterns SP2 may be formed to form a single object.

In an embodiment, the first connection pattern CP1 is illustrated as first and second sub-connection patterns CPa and CPb, which are spaced apart from each other in the second direction DR2. The first sub-connection pattern CPa is illustrated to have a structure, in which a first line portion A1 and a second line portion A2 extending in a fourth direction DR4 and a third line portion A3 and a fourth line portion A4 extending in a fifth direction DR5 are connected to each other, as shown in FIG. 5B. The fourth direction DR4 and the fifth direction DR5 may be directions that are diagonal to the first and second directions DR1 and DR2.

The first sub-connection pattern CPa and the second sub-connection pattern CPb are illustrated to have a line symmetry about an axis extending in the first direction DR1. In detail, the second sub-connection pattern CPb may include a first line portion A5 and a second line portion A6, which are extended in the fifth direction DR5 and are respectively symmetric with the first and second line portions A1 and A2 of the first sub-connection pattern CPa, and a third line portion A7 and a fourth line portion A8, which are extended in the fourth direction DR4 and are respectively symmetric to the third and fourth line portions A3 and A4 of the first sub-connection pattern CPa.

However, embodiments according to the inventive concept are not limited to this example, and in an embodiment, the first connection pattern CP1 may be provided as a single pattern. In addition, if the first connection pattern CP1 is coupled to the first sensor patterns SP1, the shape of the first connection pattern CP1 may be variously changed, and the inventive concept is not limited to a specific embodiment.

Referring to FIG. 5C, the first sensor patterns SP1, the second sensor patterns SP2, and the second connection pattern CP2 may be disposed on a layer, which is different from that under the first connection pattern CP1, and may constitute the second conductive layer 20. For convenience in illustration, in FIG. 5C, the first sensor patterns SP1 are illustrated with a hatched pattern.

The first sensor patterns SP1 may be spaced apart from the second sensor patterns SP2 and the second connection pattern CP2, when viewed in a plan view. The first sensor patterns SP1 may be electrically disconnected from the second sensor patterns SP2 and the second connection pattern CP2.

The second sensor patterns SP2 and the second connection pattern CP2 may be disposed on the same layer. The second sensor patterns SP2 and the second connection pattern CP2 may be connected to each other to form a single object, as shown. However, embodiments according to the inventive concept are not limited to this example or a specific embodiment, and in an embodiment, the second sensor patterns SP2 and the second connection pattern CP2 may be disposed on different layers and may be coupled to each other.

In an embodiment, each of the first sensor patterns SP1, the second sensor patterns SP2, and the second connection pattern CP2 may be composed of a plurality of the mesh lines MSL. The mesh lines MSL may include a first mesh line MSL1, which is extended in the fourth direction DR4, and a second mesh line MSL2, which is extended in the fifth direction DR5 to cross the first mesh line MSL1.

In the present specification, an expression "two elements cross each other" means that extension directions of the two elements are different from each other. Such elements crossing each other may be disposed on the same layer (or at the same level) or on different layers (or at different levels).

The first mesh line MSL1 and the second mesh line MSL2 may be disposed on the same layer and may be connected to each other to form a plurality of mesh openings MSL-OP. Each of the mesh openings MSL-OP may be overlapped with the light-emitting region PXA (e.g., see FIG. 4). The conductive patterns shown in FIG. 4 may correspond to the mesh lines MSL.

Some of the mesh lines MSL may be cut to define a border BA between the sensor patterns. The border BA between the first sensor patterns SP1 and the second sensor patterns SP2 may be formed by a portion, which is formed by removing a portion of the first mesh line MSL1, or by a portion, which is formed by removing a portion of the second mesh line MSL2. In an embodiment, adjacent ones of the mesh lines MSL may be electrically disconnected from each other by removing some of the mesh lines MSL. The border BA between the first sensor patterns SP1 and the second sensor patterns SP2 may be easily designed along a cutting line, which is formed in the mesh lines MSL.

In an embodiment, the input sensing unit ISU may further include a floating pattern FP. For convenience in illustration, the floating pattern FP is illustrated with a shaded pattern.

When viewed in a plan view, the floating pattern FP may be disposed at a position overlapped with the first connection pattern CP1. In an embodiment, an overlapping area between the floating pattern FP and the first connection pattern CP1 may range from about 10% to 90% of an area of the first connection pattern CP1. When the overlapping area between the floating pattern FP and the first connection pattern CP1 is larger than about 90% of the area of the first connection pattern CP1 or is smaller than 10%, the reflectance of an external light may have a large difference between a region occupied by the first connection pattern CP1 and a region located around the first connection pattern CP1 (e.g., occupied by the second sensor patterns SP2 or the first sensor patterns SP1).

The reflectance of the external light may occur when an external light incident to the active region AA from the outside of the electronic apparatus EA is reflected by the conductive patterns (e.g., the sensor patterns SP1 and SP2 or the connection patterns CP1 and CP2 in the input sensing unit ISU) or by the conductive patterns of the display unit DU (e.g., the thin film transistor or the electrodes of the light emitting device).

In an embodiment, the reflection of the external light will be mainly described, based on the reflection of the external light in the input sensing unit ISU. The difference in reflectance of the external light between a region provided with the first connection pattern CP1 and other regions may result from that the first connection pattern CP1 is disposed on a layer different from that under other patterns.

In an embodiment of the inventive concept, because the overlapping area between the floating pattern FP and the first connection pattern CP1 is designed to be about 10% to 90% of the area of the first connection pattern CP1, it may be possible to reduce a difference in reflectance between a region occupied by the first connection pattern CP1 and a neighboring region and to prevent the first connection pattern CP1 from being recognized by a user.

In an embodiment, a plurality of the floating patterns FP may be provided to be spaced apart from each other, as shown in FIG. 5C. The plurality of the floating patterns FP may be located between the mesh lines MSL. The floating pattern FP may be spaced apart from the second sensor patterns SP2 or the second connection pattern CP2, when viewed in a plan view. Accordingly, the floating pattern FP may be electrically disconnected from the second sensor patterns SP2 or the second connection pattern CP2, and thus, it may be possible to prevent the floating pattern FP from affecting the second sensor patterns SP2 or the second connection pattern CP2 (i.e., an electric interference issue therebetween).

Some of the mesh lines MSL constituting the second sensor patterns SP2 may be removed, and the second sensor patterns SP2 may be spaced apart from the floating pattern FP. Some of the mesh lines MSL of the second sensor patterns SP2, which are overlapped with the first connection pattern CP1, may cross the first connection pattern CP1 and may not be extended parallel to the first connection pattern CP1.

Portions of the first mesh line MSL1 of the second sensor patterns SP2, which are overlapped with the first and second line portions A1 and A2 of the first sub-connection pattern CPa or the third and fourth line portions A7 and A8 of the second sub-connection pattern CPb extending parallel to the first mesh line MSL1, may be removed. In addition, portions of the second mesh line MSL2 of the second sensor patterns SP2, which are overlapped with the third and fourth line portions A3 and A4 of the first sub-connection pattern CPa or the first and second line portions A5 and A6 of the second sub-connection pattern CPb extending parallel to the second mesh line MSL2, may be removed.

Accordingly, the first mesh line MSL1 may cross the first connection pattern CP1 in a region overlapped with the first connection pattern CP1 but may not be extended in a direction parallel to the first connection pattern CP1. Furthermore, the second mesh line MSL2 may cross the first connection pattern CP1 in a region overlapped with the first connection pattern CP1 but may not be extended in a direction parallel to the first connection pattern CP1. Accordingly, it may be possible to reduce an overlapping area between the second connection pattern CP2 and the first sensor patterns SP1 and thereby to reduce a noise issue caused by a parasitic capacitance. In addition, the floating pattern FP may be spaced apart from the second sensor patterns SP2 and may be arranged along the first connection pattern CP1.

Figure 6A:
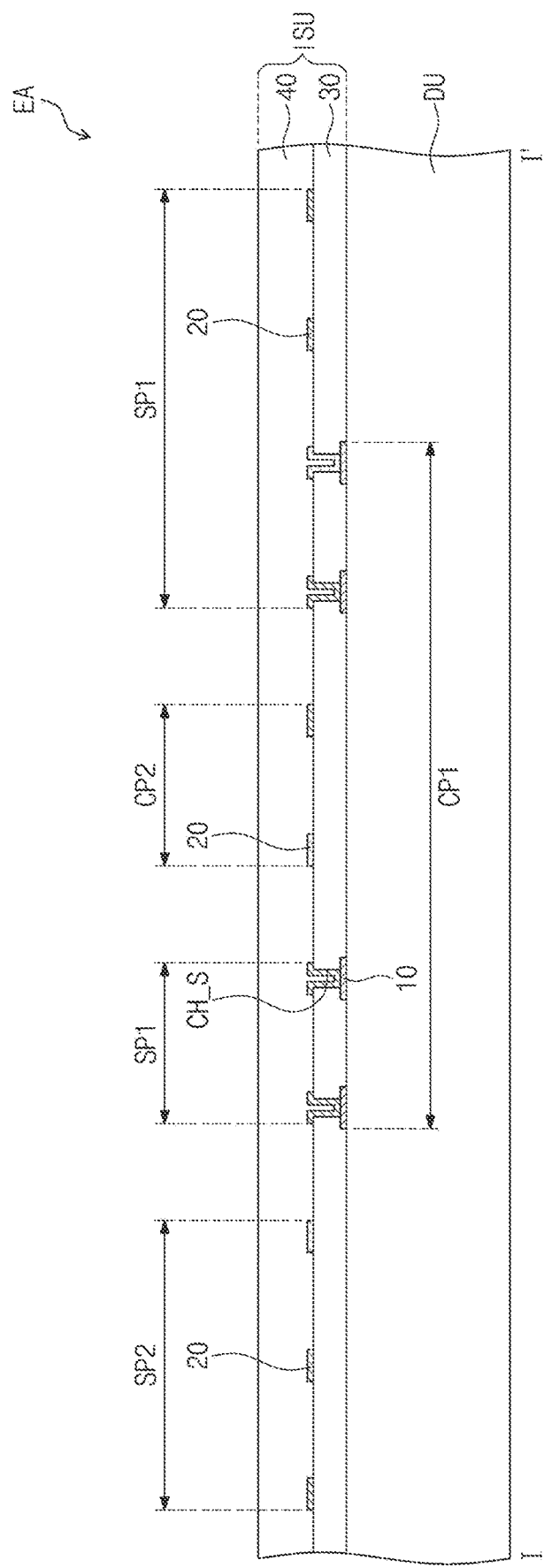
FIG. 6A is a sectional view taken along a line I-I' of FIG. 5.
Figure 6B:
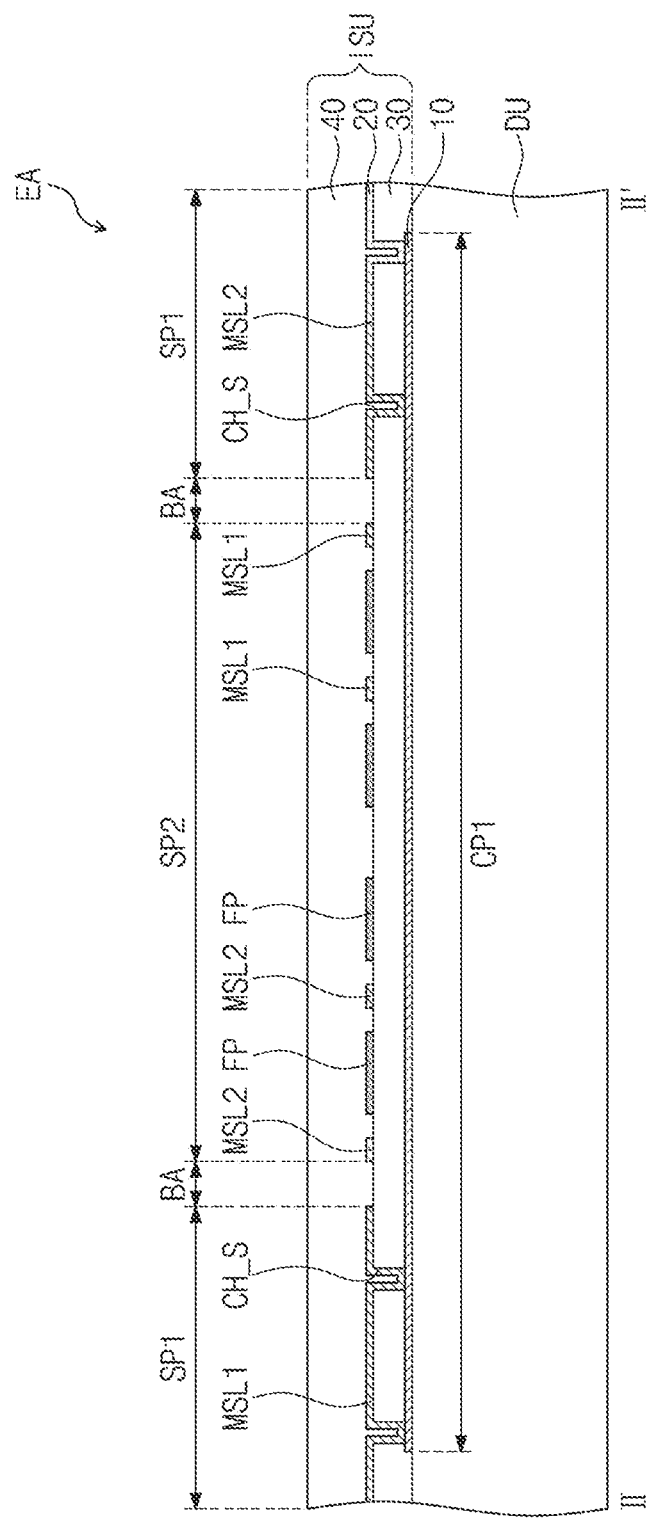
FIG. 6B is a sectional view taken along a line II-II' of FIG. 5.
Figure 6C:
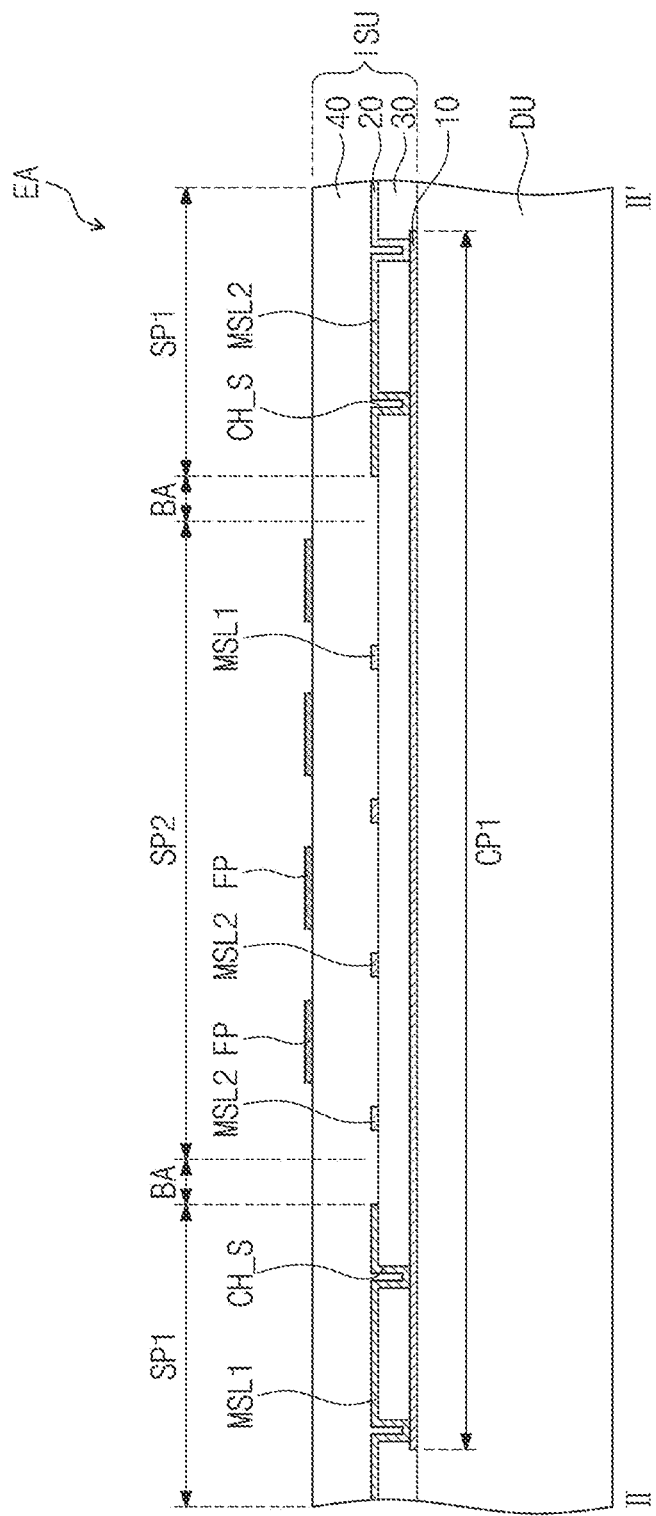
FIG. 6C is a sectional view illustrating a portion of an electronic apparatus in an embodiment of the inventive concept.

FIG. 6A is a sectional view taken along a line I-I' of FIG. 5. FIG. 6B is a sectional view taken along a line II-II' of FIG. 5. FIG. 6C is a sectional view illustrating a portion of an electronic apparatus in an embodiment of the inventive concept. For convenience in illustration, FIG. 6C illustrates a region corresponding to FIG. 6B.

As shown in FIG. 6A, the first sensor patterns SP1, the second sensor patterns SP2, and the second connection pattern CP2 may be located on the first connection pattern CP1. For example, the first connection pattern CP1 may be located between the display unit DU and the first insulating layer 30, and the first sensor patterns SP1, the second sensor patterns SP2, and the second connection pattern CP2 may be located between the first insulating layer 30 and the second insulating layer 40. The conductive patterns constituting each of the first and second conductive layers 10 and 20 may mean the mesh lines MSL (e.g., see FIG. 5A).

The first sensor patterns SP1 may be coupled to the first connection pattern CP1 through the contact holes CH_S. The contact holes CH_S may be formed to penetrate an insulating layer between the first and second conductive layers 10 and 20.

As shown in FIG. 6B, in the second sensor pattern SP2, a mesh line, which is extended in a direction parallel to the first connection pattern CP1, may not be overlapped with the first connection pattern CP1, when viewed in a plan view. A mesh line of the second sensor pattern SP2, which is overlapped with the first connection pattern CP1 in a plan view, may be extended in a direction crossing the first connection pattern CP1. Unlike the first and second mesh lines MSL1 and MSL2 of the first sensor patterns SP1 overlapped with the first connection pattern CP1 in a plan view, the first and second mesh lines MSL1 and MSL2 of the second sensor patterns SP2 overlapped with the first connection pattern CP1 in a plan view may cross the first connection pattern CP1.

The floating pattern FP may be arranged such that it is spaced apart from the first mesh line MSL1 and the second mesh line MSL2. The floating pattern FP may be overlapped with the first connection pattern CP1, when viewed in a plan view, and may be extended in a direction parallel to an extension direction of the first connection pattern CP1. In an embodiment, a plurality of the floating patterns FP may be provided in internal spaces of the mesh lines.

In an embodiment, the floating pattern FP may be formed of or include the same material as the second sensor patterns SP2. Furthermore, the floating pattern FP may be concurrently patterned by the same process as that for the second sensor patterns SP2 (i.e., by using the same mask as that for the second sensor patterns SP2). In this case, the floating pattern FP may be formed during the process of forming the second sensor patterns SP2, and thus, it may be possible to simplify the fabrication process and to reduce the process cost. However, embodiments according to the inventive concept are not limited to this example or a specific embodiment, and in an embodiment, the floating pattern FP may be formed of a material different from the second sensor patterns SP2 or may be formed by a process different from the second sensor patterns SP2.

Alternatively, as shown in FIG. 6C, the floating pattern FP may be located on a layer, which is different from the first connection pattern CP1 or the second connection pattern CP2. The floating pattern FP may be located on the second insulating layer 40. As long as the floating pattern FP is overlapped with the first connection pattern CP1 in a plan view, the floating pattern FP may be located on a layer, which is different from the second connection pattern CP2, and the inventive concept is not limited to this example or a specific embodiment.

In an embodiment of the inventive concept, it may be possible to reduce an overlapping area between the first connection pattern CP1 and the second sensor pattern SP2 and thereby to easily prevent sensitivity of the input sensing unit ISU from being deteriorated by electric interference between the first connection pattern CP1 and the second sensor pattern SP2. Furthermore, in an embodiment of the inventive concept, because the input sensing unit ISU further includes the floating pattern FP, it may be possible to reduce a difference in visibility of the conductive patterns between a region, in which the first connection pattern CP1 is located, and a region, in which the first connection pattern CP1 is not located. Accordingly, it may be possible to prevent or reduce the first connection pattern CP1 being noticeably recognized and thereby to realize uniform visibility throughout the input sensing unit ISU.

In addition, in an embodiment of the inventive concept, because it may be possible to realize the uniform visibility throughout the input sensing unit ISU, the input sensing unit ISU may be prevented from affecting a quality of an image generated by the display unit DU. Accordingly, although the electronic apparatus EA includes both of the display unit DU and the input sensing unit ISU, the electronic apparatus EA may provide a relatively high quality image to a user.

Figure 7A:
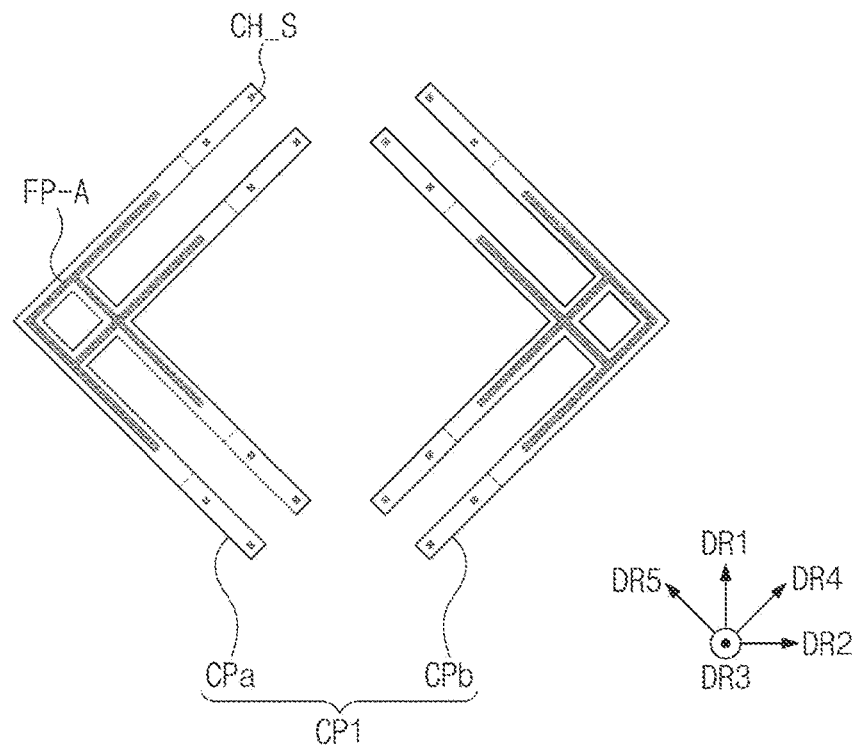
FIGS. 7A and 7B are plan views, each of which illustrates a portion of an input sensing unit in an embodiment of the inventive concept.
Figure 7B:
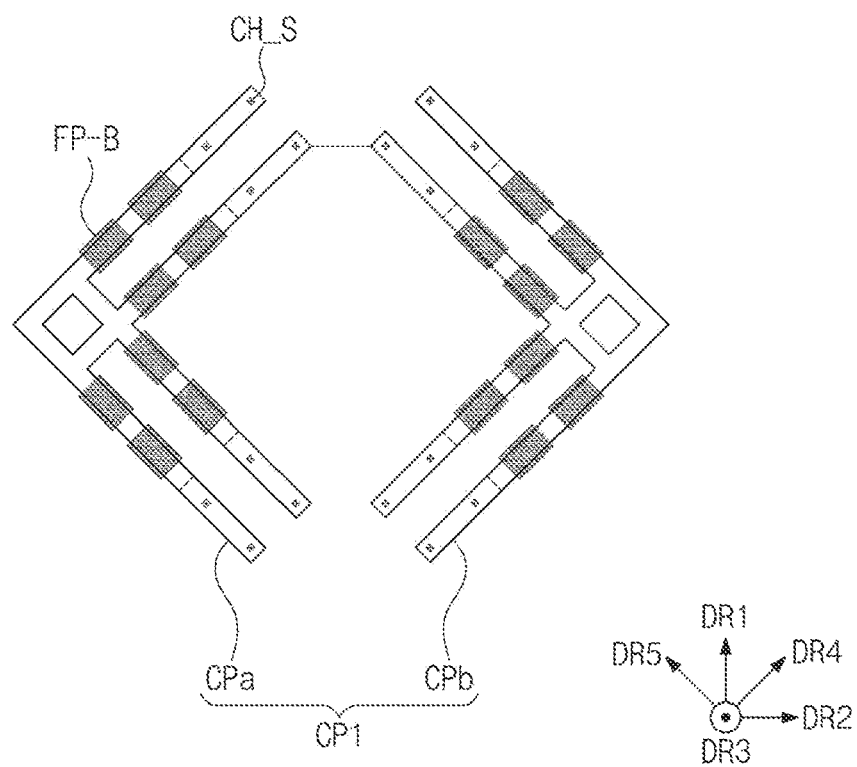

FIGS. 7A and 7B are plan views, each of which illustrates a portion of an input sensing unit in an embodiment of the inventive concept. For convenience in illustration, the first connection pattern CP1 and a floating pattern FP-A or FP-B are illustrated in FIGS. 7A and 7B, and the floating pattern FP-A or FP-B is illustrated as a shaded pattern. Hereinafter, an embodiment of the inventive concept will be described in more detail with reference to FIGS. 7A and 7B.

As shown in FIG. 7A, the floating pattern FP-A may be provided as a single object. The floating pattern FP-A may be spaced apart from the first sensor patterns SP1 (e.g., see FIG. 5A). When viewed in a plan view, the floating pattern FP-A may be overlapped with the first connection pattern CP1 and may be located in a region, except for a region provided with the contact holes CH_S of the first connection pattern CP1.

In an embodiment, the floating pattern FP-A may cross the second sensor patterns SP2 (e.g., see FIG. 5A), when viewed in a plan view. For example, in the case where the second sensor patterns SP2 have the same shape as that shown in FIG. 5A, the floating pattern FP-A may cross the first or second mesh line MSL1 or MSL2, which is electrically disconnected from the first connection pattern CP1 and crosses the first connection pattern CP1. In an embodiment, the floating pattern FP-A and the first or second mesh line MSL1 or MSL2 may be located on the same layer and may be directly connected to each other. In certain embodiments, the floating pattern FP-A and the first or second mesh line MSL1 or MSL2 may be located on different layers to cross each other and may be electrically disconnected from each other.

However, the inventive concept is not limited to this example, and in an embodiment, the floating pattern FP-A may be spaced apart from the second sensor patterns SP2, when viewed in a plan view. Here, the second sensor patterns SP2 may be formed by removing portions of the mesh lines MSL of the second sensor patterns SP2, which are overlapped with a region provided with the floating pattern FP-A.

In an embodiment, if the floating pattern FP-A is provided as a single object, the shape of the floating pattern FP-A may be variously changed. An overlapping area between the floating pattern FP-A and the first connection pattern CP1 may range from about 10% to 90% of the area of the first connection pattern CP1.

Alternatively, as shown in FIG. 7B, the floating pattern FP-B may have a width larger than the first connection pattern CP1 overlapped therewith. For example, the floating pattern FP-B may be overlapped with a portion of the first connection pattern CP1 extending in the fourth direction DR4 to have a width greater than a width of the first connection pattern CP1 in the fifth direction DR5 or may be overlapped with a portion of the first connection pattern CP1 extending in the fifth direction DR5 to have a width greater than a width of the first connection pattern CP1 in the fourth direction DR4.

In an embodiment of the inventive concept, if the floating pattern FP-A or FP-B is overlapped with the first connection pattern CP1 when viewed in a plan view, the shape or width of the floating pattern FP-A or FP-B may be variously changed, but the inventive concept is not limited to a specific embodiment. In an embodiment of the inventive concept, because the floating pattern FP-A or FP-B is arranged to be overlapped with the first connection pattern CP1, it may be possible to prevent a visibility issue from occurring in a region provided with the first connection pattern CP1.

Figure 8A:
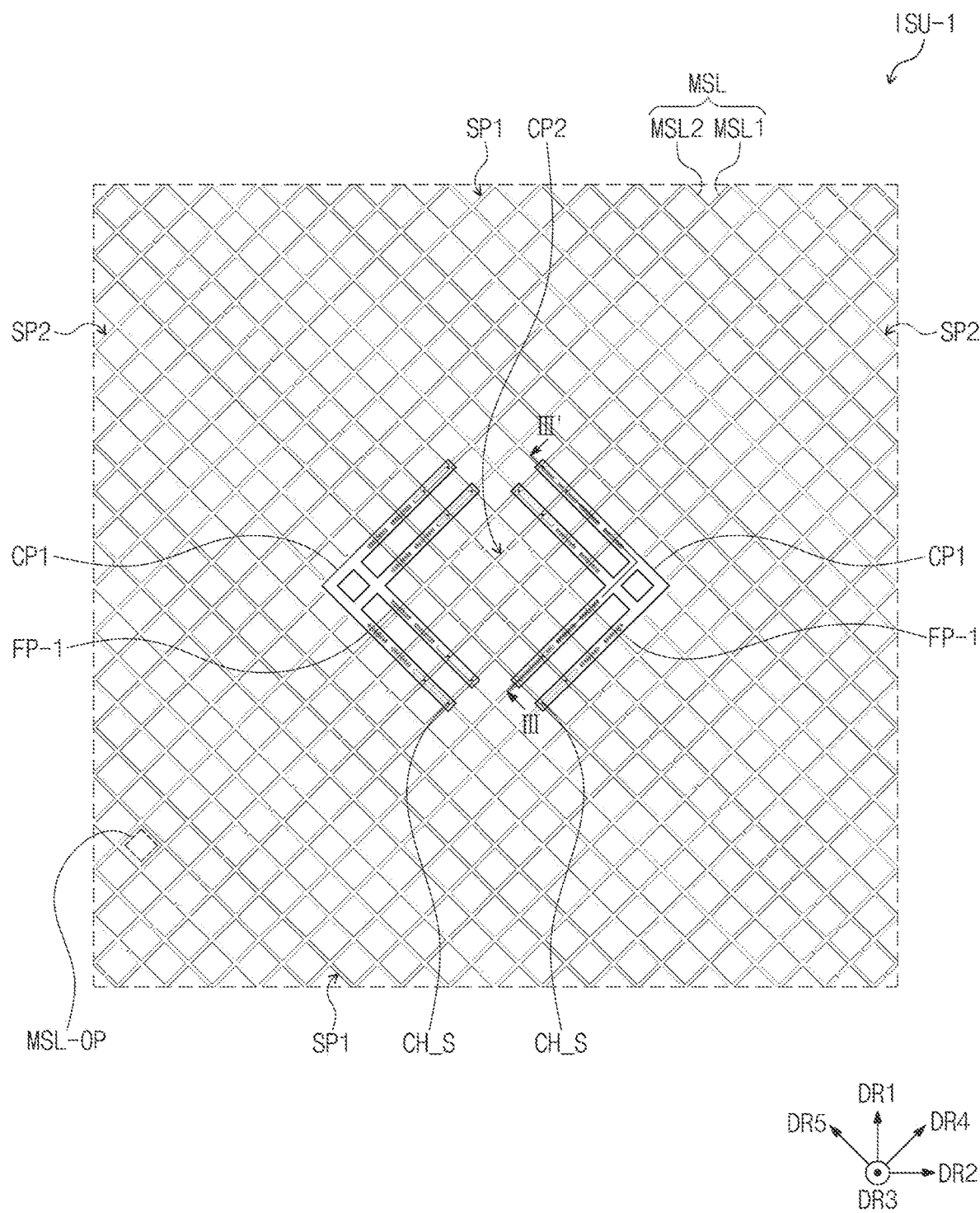
FIG. 8A is a plan view illustrating an input sensing unit in an embodiment of the inventive concept.
Figure 8B:
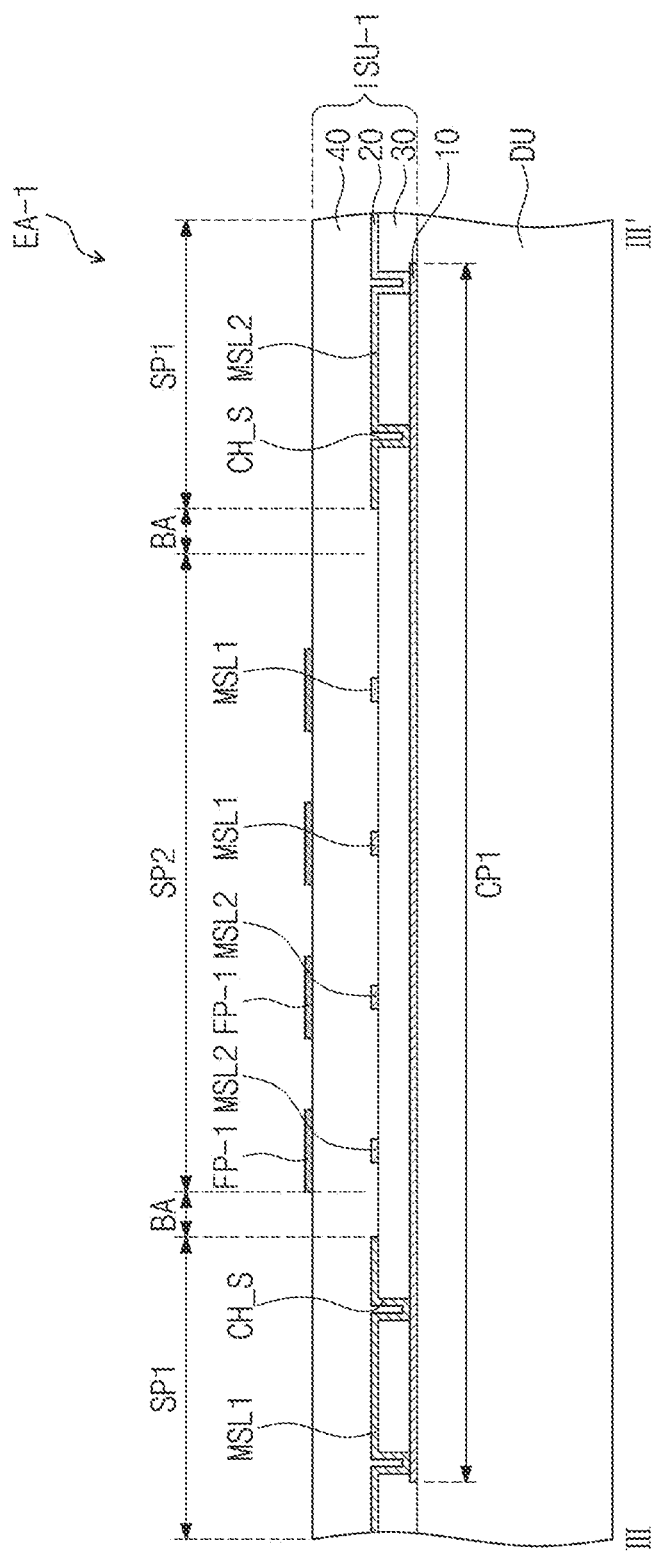
FIG. 8B is a sectional view taken along a line III-III' of FIG. 8A.

FIG. 8A is a plan view illustrating an input sensing unit in an embodiment of the inventive concept. FIG. 8B is a sectional view taken along a line III-III' of FIG. 8A. For convenience in illustration, FIG. 8A illustrates a region corresponding to FIG. 5A, and FIG. 8B illustrates a sectional view of an electronic apparatus EA-1. The region shown in FIG. 8B may correspond to the region shown in FIG. 6B. Hereinafter, an embodiment of the inventive concept will be described in more detail with reference to FIGS. 8A and 8B. Meanwhile, for concise description, an element previously described with reference to FIGS. 1 to 7B may be identified by the same reference number without repeating an overlapping description thereof.

A floating pattern FP-1 of an input sensing unit ISU-1 may be overlapped with the mesh lines MSL, when viewed in a plan view. The floating pattern FP-1 may be arranged to be overlapped with a portion of the first or second mesh line MSL1 or MSL2 of the mesh lines MSL, which is overlapped with the first connection pattern CP1, is electrically disconnected from the first connection pattern CP1, and is arranged to cross the first connection pattern CP1.

In an embodiment, the floating pattern FP-1 may be located on the second insulating layer 40. Accordingly, the floating pattern FP-1 may be spaced apart from the second sensor patterns SP2 when viewed in a sectional view and may be electrically disconnected from the second sensor patterns SP2.

In an embodiment of the inventive concept, if, in the input sensing unit ISU-1, the floating pattern FP-1 is overlapped with the first connection pattern CP1 when viewed in a plan view, the position of the floating pattern FP-1 may be variously changed. The input sensing unit ISU-1 may further include the floating pattern FP-1, and thus, it may be possible to prevent the first connection pattern CP1 from being noticeably recognized and to provide uniform visibility to a user.

Figure 9A:
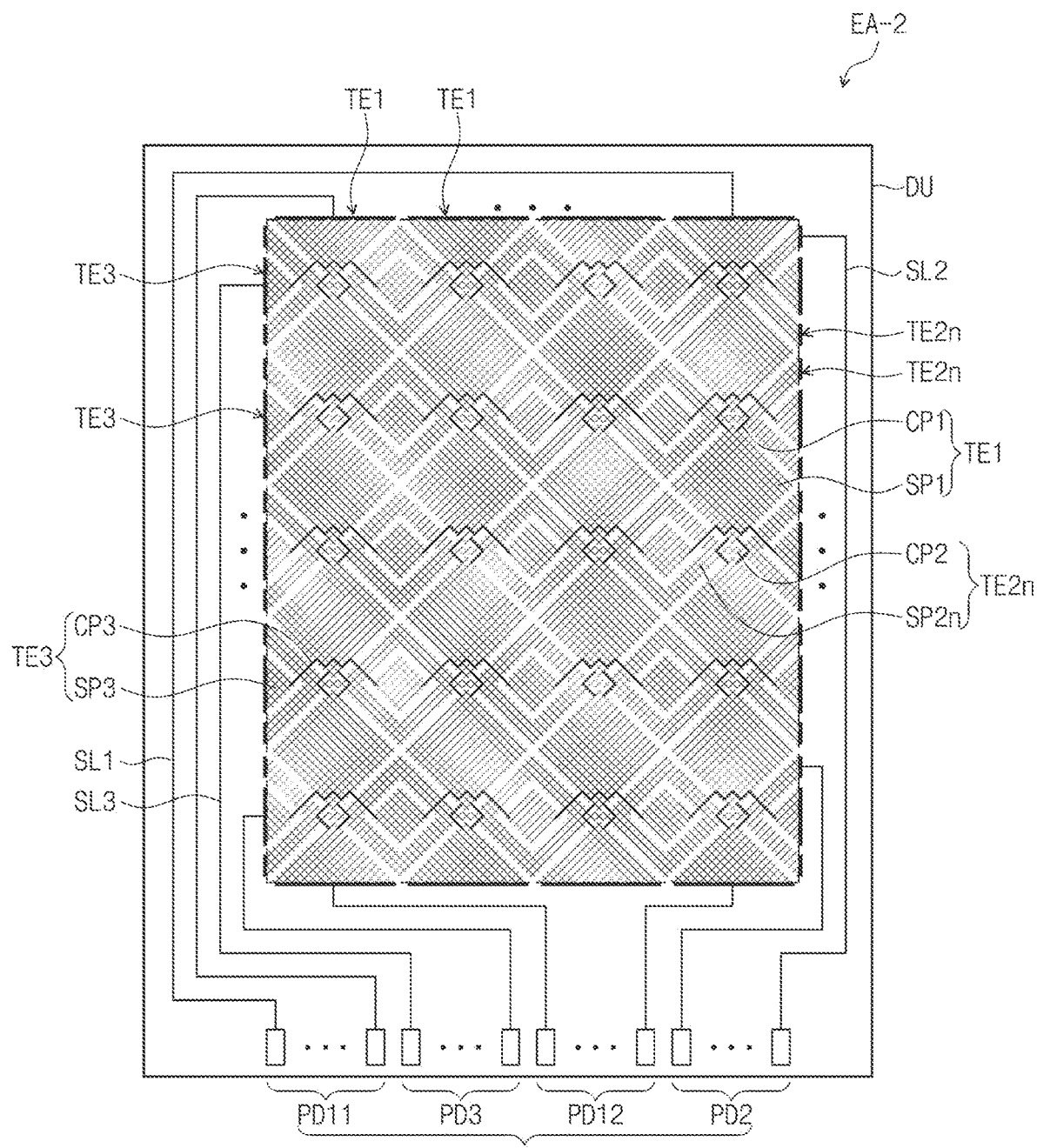
FIG. 9A is a plan view illustrating an electronic apparatus in an embodiment of the inventive concept.
Figure 9B:
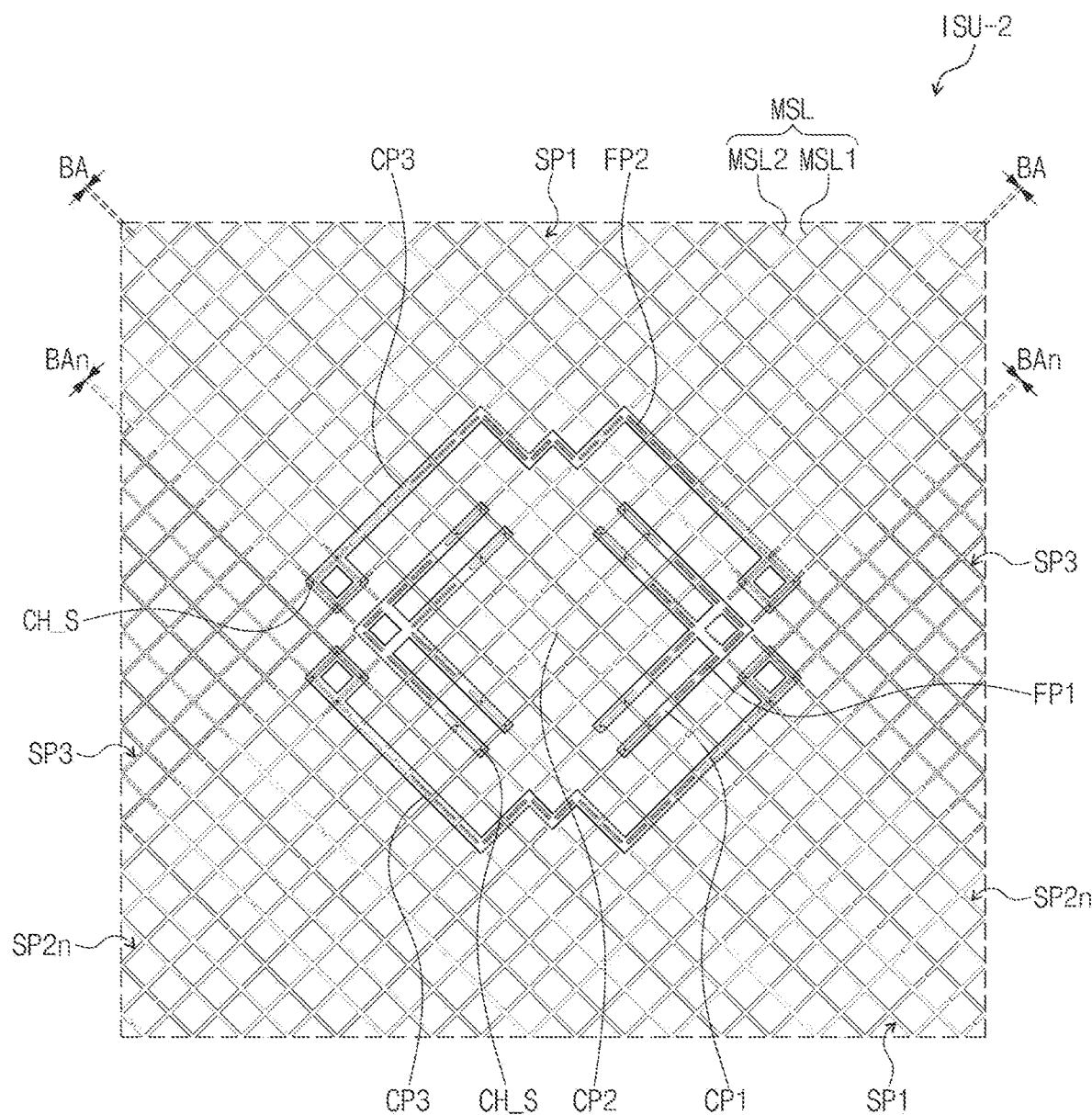
FIG. 9B is a plan view illustrating a portion of the electronic apparatus of FIG. 9A.

FIG. 9A is a plan view illustrating an electronic apparatus in an embodiment of the inventive concept. FIG. 9B is a plan view illustrating a portion of the electronic apparatus of FIG. 9A. For convenience in illustration, FIG. 9A illustrates a region corresponding to FIG. 3, and FIG. 9B illustrates a region of an input sensing unit ISU-2 corresponding to FIG. 5A. Hereinafter, an embodiment of the inventive concept will be described in more detail with reference to FIGS. 9A and 9B. Meanwhile, for concise description, an element previously described with reference to FIGS. 1 to 8B may be identified by the same reference number without repeating an overlapping description thereof.

As shown in FIG. 9A, an electronic apparatus EA-2 may further include a third sensing electrode TE3, a third signal line SL3, and a third pad PD3. The third sensing electrode TE3 may be spaced apart from the first sensing electrode TE1 and the second sensing electrode TE2, when viewed in a plan or sectional view. The third sensing electrode TE3 may send or receive independent signals to or from the first sensing electrode TE1 and a second sensing electrode TE2n. The second sensing electrode TE2n may have a different shape from the second sensing electrode TE2 shown in FIG. 4. The second connection pattern CP2n may have a shape similar to the second connection pattern CP2 shown in FIG. 4, but a second sensor pattern SP2n may have a shape enclosing a third sensor pattern SP3, which will be described below.

The third sensing electrode TE3 may be extended in the second direction DR2. In an embodiment, a plurality of the third sensing electrodes TE3 may be arranged in the first direction DR1. However, embodiments according to the inventive concept are not limited to this example or a specific embodiment, and in certain embodiments, the third sensing electrode TE3 may be extended in the first direction DR1.

The third signal line SL3 may be connected to the third sensing electrode TE3. The third signal line SL3 may be located in the peripheral region NAA and may not be recognized by a user. The third signal line SL3 may connect the third sensing electrode TE3 to the third pad PD3. The third signal line SL3 may transmit an electrical signal, which is transmitted through the third pad PD3, to the third sensing electrode TE3 or may transmit an electrical signal, which is provided from the third sensing electrode TE3, to the outside through the third pad PD3.

In an embodiment, the third sensing electrode TE3 may receive an independent electrical signal from the first sensing electrode TE1 and the second sensing electrode TE2. For example, the third sensing electrode TE3 may sense a noise, which may occur in the active region AA. Alternatively, the third sensing electrode TE3 may receive a ground voltage, and in this case, it may be possible to suppress an interference issue between the display unit DU and the input sensing unit ISU-2 and thereby to improve sensitivity of the input sensing unit ISU-2. In an embodiment, the third sensing electrode TE3 may receive a variety of signals, and the inventive concept is not limited to a specific embodiment.

The third sensing electrode TE3 may include a plurality of third sensor patterns SP3 and a plurality of third connection patterns CP3. The third connection patterns CP3 may be located between the third sensor patterns SP3 to connect adjacent ones of the third sensor patterns SP3 to each other. In FIG. 9B, for convenience in illustration, the third sensor patterns SP3 are illustrated as a shaded pattern.

In an embodiment, each of the third sensor patterns SP3 may have a shape, which is enclosed by a corresponding one of the second sensor patterns SP2n. For example, each of the third sensor patterns SP3 may have a rhombus shape whose sides are extended in the fourth direction DR4 and the fifth direction DR5, and each of the second sensor patterns SP2n may have a rhombus ring shape enclosing a corresponding one of the third sensor patterns SP3. A border BAn, which is formed by cutting the mesh lines MSL, may be defined between the second sensor patterns SP2n and the third sensor patterns SP3. However, embodiments according to the inventive concept are not limited to this example or a specific embodiment, and in an embodiment, the shape of each of the first to third sensor patterns SP1, SP2n, and SP3 may be variously changed.

The third connection patterns CP3 may be located between the third sensor patterns SP3. The third sensor patterns SP3 may be electrically connected to each other through the third connection patterns CP3. The third connection patterns CP3 may be coupled to the third sensor patterns SP3 through the second sensor patterns SP2n and the first sensor patterns SP1.

Here, the third connection patterns CP3 may be partially overlapped with the first sensor patterns SP1. Some of the first sensor patterns SP1 may be removed such that the first sensor patterns SP1 are not overlapped with the third connection patterns CP3. For example, portions of the mesh lines MSL of the first sensor patterns SP1 (e.g., a portion of the first or second mesh line MSL1 or MSL2, which is overlapped with the third connection pattern CP3 when viewed in a plan view and is extended parallel to the third connection pattern CP3) may be removed. Accordingly, a portion of the mesh lines MSL of the first sensor patterns SP1, which is located in a region overlapped with the third connection pattern CP3, may cross the third connection pattern CP3 and may not be parallel to the third connection pattern CP3.

The third connection pattern CP3 may be located on a layer different from the first sensor patterns SP1 and the second sensor patterns SP2. Accordingly, the third connection pattern CP3 may be electrically disconnected from the first sensor patterns SP1 and the second sensor patterns SP2n, even when the third connection pattern CP3 is overlapped with the first sensor patterns SP1 and the second sensor patterns SP2 when viewed in a plan view.

The third connection pattern CP3 and the first connection pattern CP1 may be located on the same layer or at the same level. The third connection pattern CP3 may stably prevent an electric short circuit with the first connection pattern CP1, because the third connection pattern CP3 is spaced apart from the first connection pattern CP1 when viewed in a plan view.

In an embodiment, the input sensing unit ISU-2 may include a first floating pattern FP1 and a second floating pattern FP2. The first floating pattern FP1 may be arranged to be overlapped with the first connection pattern CP1, when viewed in a plan view. The first floating pattern FP1 may correspond to the floating pattern FP shown in FIG. 5A, and thus, an overlapping description will be omitted.

The second floating pattern FP2 may be arranged to be overlapped with the third connection pattern CP3, when viewed in a plan view. In an embodiment, a plurality of the second floating patterns FP2 may be provided and may be arranged side by side in an extension direction of the third connection pattern CP3. The second floating pattern FP2 may be spaced apart from the mesh lines MSL constituting the first sensor patterns SP1.

The second floating pattern FP2 may reduce a difference in reflectance between a region, in which the third connection pattern CP3 is located, and a region, in which the third connection pattern CP3 is not located. Because the input sensing unit ISU-2 further includes the second floating pattern FP2, it may be possible to prevent the third connection pattern CP3 from being easily recognized and to realize uniform visibility throughout the input sensing unit ISU-2. However, embodiments according to the inventive concept are not limited to this example or a specific embodiment, and one of the first and second floating patterns FP1 and FP2 may be omitted from the input sensing unit ISU-2.

In an embodiment of the inventive concept, it may be possible to prevent some of conductive patterns of an input sensing unit from being noticeably recognized and thereby to realize uniform visibility of an image, which is provided to a user, throughout the input sensing unit. In addition, in an embodiment of the inventive concept, it may be possible to realize uniform visibility throughout an active region, on which an image is displayed, and thereby to prevent an image quality from being deteriorated by the input sensing unit.

While example embodiments of the inventive concepts have been particularly shown and described, it will be understood by one of ordinary skill in the art that variations in form and detail may be made therein without departing from the spirit and scope of the attached claims, and their equivalents.

What is claimed is:

1. An input sensor, comprising:
    a first sensing electrode comprising first sensing patterns and a first pattern located on a layer different from the first sensing patterns and located between the first sensing patterns;
    a second sensing electrode located on a same layer as the first sensing patterns; and
    a floating pattern insulated from the second sensing electrode and extending in a same direction as the first pattern,
    wherein at least a portion of the floating pattern overlaps the first pattern,
    the floating pattern is disposed on a different layer from the first pattern, and the floating pattern is spaced apart from the first sensing electrode and the second sensing electrode.

2. The input sensor of claim 1, further comprising a sensing insulating layer that covers the first pattern and on which the first sensing patterns, the second sensing electrode, and the floating pattern are located, and
    wherein the first pattern is connected to the first sensing patterns through a contact hole of the sensing insulating layer.

3. The input sensor of claim 2, the portion of the floating pattern does not overlap the contact hole.

4. The input sensor of claim 1, wherein the floating pattern is on the same layer as the first sensing patterns.

5. The input sensor of claim 1, wherein the floating pattern comprises a same material as the second sensing electrode.

6. The input sensor of claim 1, wherein the first sensing patterns, the second sensing electrode, and the floating pattern comprise mesh lines extending in directions crossing each other.

7. The input sensor of claim 6, wherein the mesh lines included in the floating pattern overlap the first pattern and are spaced apart from each other.

8. The input sensor of claim 6, wherein at least some of the mesh lines included in the floating pattern are surrounded by the mesh lines included in the second sensing electrode.

9. The input sensor of claim 1, wherein an overlapping area between the floating pattern and the first pattern is about 10% or more and 90% or less of an area of the first pattern.

10. The input sensor of claim 1, wherein the floating pattern is electrically insulated from the first sensing patterns and the second sensing electrode.

11. An input sensor, comprising:
    a first sensing electrode comprising first sensing patterns and a first pattern located on a layer different from the first sensing patterns and located between the first sensing patterns;
    a second sensing electrode located on a same layer as the first sensing patterns; and
    a floating pattern insulated from the second sensing electrode; and
    a sensing insulating layer that covers the first pattern and on which the first sensing patterns, the second sensing electrode, and the floating pattern are located, wherein at least a portion of the floating pattern overlaps the first pattern and the first pattern is connected to the first sensing patterns through a contact hole of the sensing insulating layer, and
    wherein the portion of the floating pattern is spaced apart from the contact hole,
    the floating pattern is disposed on a different layer from the first pattern, and the floating pattern is spaced apart from the first sensing electrode and the second sensing electrode.

12. The input sensor of claim 11, wherein the floating pattern extends in a same direction as the first pattern.

13. The input sensor of claim 11, wherein the floating pattern comprises a plurality of segments spaced apart from each other and insulated from the second sensing electrode.

14. The input sensor of claim 13, wherein at least one of the plurality of segments is surrounded by a portion of the second sensing electrode.

15. The input sensor of claim 13, wherein the plurality of segments has different shapes from each other.

16. The input sensor of claim 13, wherein a sum of areas of the plurality of segments is smaller than an area of the first pattern.

17. The input sensor of claim 13, wherein the first sensing patterns, the second sensing electrode, and the plurality of segments comprise mesh lines extending in directions crossing each other.

18. The input sensor of claim 13, wherein at least one of mesh lines included in the plurality of segments is surrounded by mesh lines included in the second sensing electrode overlapping the first pattern.

19. The input sensor of claim 11, wherein an overlapping area between the floating pattern and the first pattern is about 10% or more and 90% or less of an area of the first pattern.

20. The input sensor of claim 11, wherein the floating pattern is electrically insulated from the first sensing patterns and the second sensing electrode.

* * * * *